US011984957B2

(12) United States Patent
Kassir et al.

(10) Patent No.: US 11,984,957 B2
(45) Date of Patent: May 14, 2024

(54) RADAR-ASSISTED BEAM FAILURE AVOIDANCE IN NLOS ENVIRONMENTS

(71) Applicant: QUALCOMM Incorporated, San Diego, CA (US)

(72) Inventors: Saadallah Kassir, Austin, TX (US); Kapil Gulati, Belle Mead, NJ (US); Preeti Kumari, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 58 days.

(21) Appl. No.: 17/453,831

(22) Filed: Nov. 5, 2021

(65) Prior Publication Data

US 2023/0144860 A1     May 11, 2023

(51) Int. Cl.
| | |
|---|---|
| *H04L 5/12* | (2006.01) |
| *H04B 7/06* | (2006.01) |
| *H04B 7/08* | (2006.01) |
| *H04B 17/345* | (2015.01) |
| *H04W 36/06* | (2009.01) |
| *H04W 76/18* | (2018.01) |

(52) U.S. Cl.
CPC ......... *H04B 7/0639* (2013.01); *H04B 7/0695* (2013.01); *H04B 7/086* (2013.01); *H04B 17/345* (2015.01); *H04W 36/06* (2013.01); *H04W 76/18* (2018.02)

(58) Field of Classification Search
CPC .. H04B 7/0639; H04B 17/345; H04B 7/0695; H04B 7/086; H04W 76/18; H04W 36/06
USPC ................ 375/262, 260, 259, 219, 295, 316
See application file for complete search history.

(56) References Cited

U.S. PATENT DOCUMENTS

| | | | |
|---|---|---|---|
| 2019/0223043 A1* | 7/2019 | Geng | H04W 24/10 |
| 2021/0273686 A1 | 9/2021 | Jansson et al. | |
| 2021/0321378 A1* | 10/2021 | Rahman | H04B 7/0695 |
| 2023/0127429 A1* | 4/2023 | Rofougaran | H04W 4/029 370/315 |

FOREIGN PATENT DOCUMENTS

WO     2021030685 A1     2/2021

OTHER PUBLICATIONS

International Search Report and Written Opinion—PCT/US2022/046478—ISA/EPO—dated Dec. 16, 2022.

* cited by examiner

*Primary Examiner* — Zewdu A Kassa
(74) *Attorney, Agent, or Firm* — Procopio, Cory, Hargreaves & Savitch LLP/QUALCOMM Incorporated

(57) ABSTRACT

This disclosure provides systems, devices, apparatus, and methods, including computer programs encoded on storage media, for radar-assisted beam failure. A second wireless device may transmit, to a first wireless device, a configuration to monitor for a potential obstruction for a set of one or more beams for the wireless communication with the second wireless. The first wireless device may receive, from the second wireless device, the configuration to monitor for the potential obstruction for the set of one or more beams for the wireless communication with the second wireless device. The first wireless device may perform radar detection for the potential obstruction to the set of one or more beams for the wireless communication with the second wireless device.

36 Claims, 14 Drawing Sheets

RADAR-ASSISTED BEAM FAILURE AVOIDANCE IN NLOS ENVIRONMENTS

INTRODUCTION

The present disclosure relates generally to communication systems, and more particularly, to beam failure avoidance techniques.

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communication (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

BRIEF SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, an apparatus for wireless communication at a first wireless device is provided. The apparatus includes a memory and at least one processor coupled to the memory, the memory and the at least one processor are configured to receive, from a second wireless device, a configuration to monitor for a potential obstruction for a set of one or more beams for wireless communication with the second wireless device; and perform radar detection for the potential obstruction to the set of one or more beams for the wireless communication with the second wireless device.

In another aspect of the disclosure, a method of wireless communication at a first wireless device is provided. The method includes receiving, from a second wireless device, a configuration to monitor for a potential obstruction for a set of one or more beams for wireless communication with the second wireless device; and performing radar detection for the potential obstruction to the set of one or more beams for the wireless communication with the second wireless device.

In another aspect of the disclosure, an apparatus for wireless communication at a first wireless device is provided. The apparatus includes means for receiving, from a second wireless device, a configuration to monitor for a potential obstruction for a set of one or more beams for the wireless communication with the second wireless device; and means for performing radar detection for the potential obstruction to the set of one or more beams for the wireless communication with the second wireless device.

In another aspect of the disclosure, a non-transitory computer-readable storage medium at a first wireless device is provided. The non-transitory computer-readable storage medium is configured to receive, from a second wireless device, a configuration to monitor for a potential obstruction for a set of one or more beams for the wireless communication with the second wireless device; and perform radar detection for the potential obstruction to the set of one or more beams for the wireless communication with the second wireless device.

In an aspect of the disclosure, an apparatus for wireless communication at a second wireless device is provided. The apparatus includes a memory and at least one processor coupled to the memory, the memory and the at least one processor are configured to transmit, to a first wireless device, a configuration to monitor for a potential obstruction for a set of one or more beams for wireless communication with the second wireless device; and receive, from the first wireless device, information based on radar measurement associated with the set of one or more beams for the wireless communication with the second wireless device.

In another aspect of the disclosure, a method of wireless communication at a second wireless device is provided. The method includes transmitting, to a first wireless device, a configuration to monitor for a potential obstruction for a set of one or more beams for wireless communication with the second wireless device; and receiving, from the first wireless device, information based on radar measurement associated with the set of one or more beams for the wireless communication with the second wireless device.

In another aspect of the disclosure, an apparatus for wireless communication at a second wireless device is provided. The apparatus includes means for transmitting, to a first wireless device, a configuration to monitor for a potential obstruction for a set of one or more beams for wireless communication with the second wireless device; and receive, from the first wireless device, information based on radar measurement associated with the set of one or more beams for the wireless communication with the second wireless device.

In another aspect of the disclosure, a non-transitory computer-readable storage medium at a second wireless device is provided. The non-transitory computer-readable storage medium is configured to transmit, to a first wireless device, a configuration to monitor for a potential obstruction for a set of one or more beams for wireless communication with the second wireless device; and receive, from the first wireless device, information based on radar measurement associated with the set of one or more beams for the wireless communication with the second wireless device.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
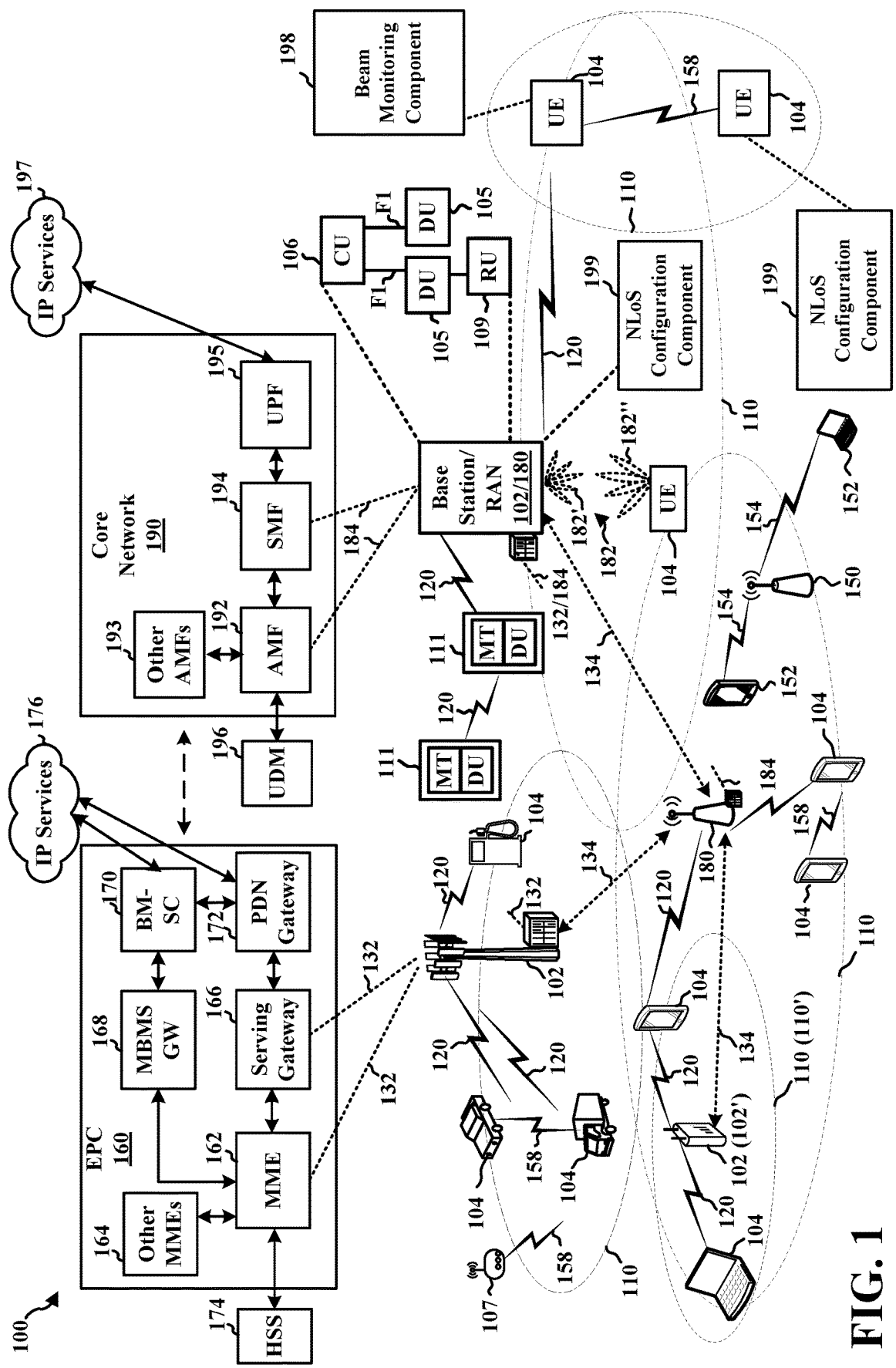
FIG. 1 is a diagram illustrating an example of a wireless communications system and an access network, in accordance with aspects presented herein.

In dynamic communication environments, such as environments associated with vehicular networks, a first wireless device and a second wireless device may communicate with each other over a communication link having a path that reflects off an object within the communication environment. For example, a base station may transmit a beam in a beam direction that causes the beam to reflect off an object, such as a building, prior to being received by a user equipment (UE). A location at which the beam reflects off the object may be referred to herein as a "reflection point". In some cases, the portion of the communication path that corresponds to locations after the reflection point of the beam may be non-line-of-sight (NLoS) portions of communication link for the base station.

Objects, such as vehicles, that move about the communication environment may occasionally cross the path of the communication link between the base station and the UE, which may cause a beam failure between the UE and the base station. In some configurations, the base station may include a radar device that may be utilized to predict that an object is going to block/obstruct the communication link between the base station and the UE. Based on the predicted obstruction, the base station may proactively switch to a different communication beam with the UE before the obstruction occurs in order to avoid a potential beam failure.

While a radar device at the base station may be used to predict a blockage/obstruction of the communication link, such predictions may only be performed for the LoS portion of the communication link. That is, the radar device at the base station may be unable to sense object trajectories that are not within a direct line-of-sight (LoS) of the radar device.

Aspects presented herein provide for improved beam management with a first wireless device and a second wireless device. As presented herein, the second wireless device, such as a base station, may configure the first wireless device, such as a UE, to monitor a set of receive beams of the UE from a perspective of the UE and to provide information to the base station about anticipated UE receive beam blockages. In further examples, the UE may monitor a set of transmit beams from a perspective of the UE to provide information to the base station about anticipated UE transmit beam blockages. The perspective of the UE may correspond to a field of view of the UE (e.g., for performing beam detection) based on a particular location/position of the UE in a communication environment. Thus, the perspective of the UE may change as the particular location/position of the UE changes within the communication environment. In an example, the perspective of the UE may allow the UE to receive a beam from the base station that includes a reflected portion of the beam that is not within a field of view of the base station upon transmission of the beam, as the base station may have a different perspective of the communication environment than the UE.

The UE may perform radar measurements to detect potential receive beam blockages, and if a potential receive beam blockage is detected from the UE's perspective, the UE may inform the base station so that the base station may switch to a different transmission beam for communicating with the UE. Beam blockage/beam blocking refers to an object that obstructs the communication path of the beams communicated between the first wireless device and the second wireless device, where the communication path may have a LoS portion and a NLoS portion that are separated via the reflection point of the communicated beams. Thus, the base station may adjust for a potential beam blockage that is not detected from the base station's perspective. For example, the base station may configure the UE to monitor a set of beams in a NLoS portion of the communication path. If the UE detects (e.g., based on a radar device located at the UE) that an object is predicted to block/obstruct the NLoS portion of the communication path, the UE may report such information to the base station. The base station may use the reported information to switch to a different communication beam with the UE (e.g., different base station transmit beam) prior to the obstruction occurring in association with the NLoS portion of the communication path, which may avoid a potential beam failure between the UE and the base station. Accordingly, such techniques may be performed to reduce a number of beam failures experienced between the base station and the UE, which may improve an overall reliability of such communications.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more examples, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the types of computer-readable media, or any other medium that can be used to store computer executable code in the form of instructions or data structures that can be accessed by a computer.

While aspects and implementations are described in this application by illustration to some examples, those skilled in the art will understand that additional implementations and use cases may come about in many different arrangements and scenarios. Aspects described herein may be implemented across many differing platform types, devices, systems, shapes, sizes, and packaging arrangements. For example, implementations and/or uses may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described aspects may occur. Implementations may range a spectrum from chip-level or modular components to non-modular, non-chip-level implementations and further to aggregate, distributed, or original equipment manufacturer (OEM) devices or systems incorporating one or more aspects of the described aspects. In some practical settings, devices incorporating described aspects and features may also include additional components and features for implementation and practice of claimed and described aspect. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that aspects described herein may be practiced in a wide variety of devices, chip-level components, systems, distributed arrangements, aggregated or disaggregated components, end-user devices, etc. of varying sizes, shapes, and constitution.

FIG. 1 is a diagram illustrating an example of a wireless communications system and an access network 100. The wireless communications system (also referred to as a wireless wide area network (WWAN)) includes base stations 102, user equipments (UEs) 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G NR (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN)

sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The first backhaul links 132, the second backhaul links 184 (e.g., Xn interface), and the third backhaul links 134 may be wired or wireless.

In some aspects, a base station 102 or 180 may be referred as a RAN and may include aggregated or disaggregated components. As an example of a disaggregated RAN, a base station may include a central unit (CU) 106, one or more distributed units (DU) 105, and/or one or more remote units (RU) 109, as illustrated in FIG. 1. A RAN may be disaggregated with a split between an RU 109 and an aggregated CU/DU. A RAN may be disaggregated with a split between the CU 106, the DU 105, and the RU 109. A RAN may be disaggregated with a split between the CU 106 and an aggregated DU/RU. The CU 106 and the one or more DUs 105 may be connected via an F1 interface. A DU 105 and an RU 109 may be connected via a fronthaul interface. A connection between the CU 106 and a DU 105 may be referred to as a midhaul, and a connection between a DU 105 and an RU 109 may be referred to as a fronthaul. The connection between the CU 106 and the core network may be referred to as the backhaul. The RAN may be based on a functional split between various components of the RAN, e.g., between the CU 106, the DU 105, or the RU 109. The CU may be configured to perform one or more aspects of a wireless communication protocol, e.g., handling one or more layers of a protocol stack, and the DU(s) may be configured to handle other aspects of the wireless communication protocol, e.g., other layers of the protocol stack. In different implementations, the split between the layers handled by the CU and the layers handled by the DU may occur at different layers of a protocol stack. As one, non-limiting example, a DU 105 may provide a logical node to host a radio link control (RLC) layer, a medium access control (MAC) layer, and at least a portion of a physical (PHY) layer based on the functional split. An RU may provide a logical node configured to host at least a portion of the PHY layer and radio frequency (RF) processing. A CU 106 may host higher layer functions, e.g., above the RLC layer, such as a service data adaptation protocol (SDAP) layer, a packet data convergence protocol (PDCP) layer. In other implementations, the split between the layer functions provided by the CU, DU, or RU may be different.

An access network may include one or more integrated access and backhaul (IAB) nodes 111 that exchange wireless communication with a UE 104 or other IAB node 111 to provide access and backhaul to a core network. In an IAB network of multiple IAB nodes, an anchor node may be referred to as an IAB donor. The IAB donor may be a base station 102 or 180 that provides access to a core network 190 or EPC 160 and/or control to one or more IAB nodes 111. The IAB donor may include a CU 106 and a DU 105. IAB nodes 111 may include a DU 105 and a mobile termination (MT). The DU 105 of an IAB node 111 may operate as a parent node, and the MT may operate as a child node.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, WiMedia, Bluetooth, ZigBee, Wi-Fi based on the Institute of Electrical and Electronics Engineers (IEEE) 802.11 standard, LTE, or NR.

Some examples of sidelink communication may include vehicle-based communication devices that can communicate from vehicle-to-vehicle (V2V), vehicle-to-infrastructure (V2I) (e.g., from the vehicle-based communication device to road infrastructure nodes such as a roadside unit (RSU)), vehicle-to-network (V2N) (e.g., from the vehicle-based communication device to one or more network nodes, such as a base station), vehicle-to-pedestrian (V2P), cellular vehicle-to-everything (C-V2X), and/or a combination thereof and/or with other devices, which can be collectively referred to as vehicle-to-anything (V2X) communications. Sidelink communication may be based on V2X or other D2D communication, such as Proximity Services (ProSe), etc. In addition to UEs, sidelink communication may also be transmitted and received by other transmitting and receiving devices, such as RSU 107, etc. Sidelink communication may be exchanged using a PC5 interface.

The wireless communications system may further include a Wi-Fi access point (AP) 150 in communication with Wi-Fi stations (STAs) 152 via communication links 154, e.g., in a 5 GHz unlicensed frequency spectrum or the like. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same unlicensed frequency spectrum (e.g., 5 GHz, or the like) as used by the Wi-Fi AP 150. The small cell 102', employing NR in an unlicensed frequency spectrum, may boost coverage to and/or increase capacity of the access network.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR2-2 (52.6 GHz-71 GHz), FR4 (52.6 GHz-114.25 GHz), and FR5 (114.25 GHz-300 GHz). Each of these higher frequency bands falls within the EHF band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, FR4, FR2-2, and/or FR5, or may be within the EHF band.

A base station 102, whether a small cell 102' or a large cell (e.g., macro base station), may include and/or be referred to as an eNB, gNodeB (gNB), or another type of base station. Some base stations, such as gNB may operate in a traditional sub 6 GHz spectrum, in millimeter wave frequencies, and/or near millimeter wave frequencies in communication with the UE 104. When the gNB operates in millimeter wave or near millimeter wave frequencies, the gNB may be referred to as a millimeter wave base station. The millimeter wave base station 180 may utilize beamforming 182 with the UE 104 to compensate for the path loss and short range. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a Packet Switch (PS) Streaming (PSS) Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. In some scenarios, the term UE may also apply to one or more companion devices such as in a device constellation arrangement. One or more of these devices may collectively access the network and/or individually access the network.

Referring again to FIG. 1, in certain aspects, a first wireless device, such as the UE 104, may include a beam monitoring component 198 configured to receive a configuration from a second wireless device, such as the base station 102, UE 104, RSU 107, IAB node 111, or other device, to monitor for a potential obstruction for a set of one or more beams for wireless communication with the second wireless device; and perform radar detection for the potential obstruction to the set of one or more beams for the wireless communication with the second wireless device. As an example, a UE 104 may receive such a configuration when in a non-line of sight (NLOS) condition with the base station 102. In certain aspects, the base station 180, a UE 104, an RSU 107, or other device may include a NLoS configuration component 199 configured to transmit, to a first wireless device, a configuration to monitor for a potential obstruction for a set of one or more beams for wireless communication with the second wireless device; and receive, from the first wireless device, information based on radar measurement associated with the set of one or more beams for the wireless communication with the second wireless device. Although the following description may be focused on 5G NR, the concepts described herein may be applicable to other similar areas, such as LTE, LTE-A, CDMA, GSM, and other wireless technologies.

Figure 2:
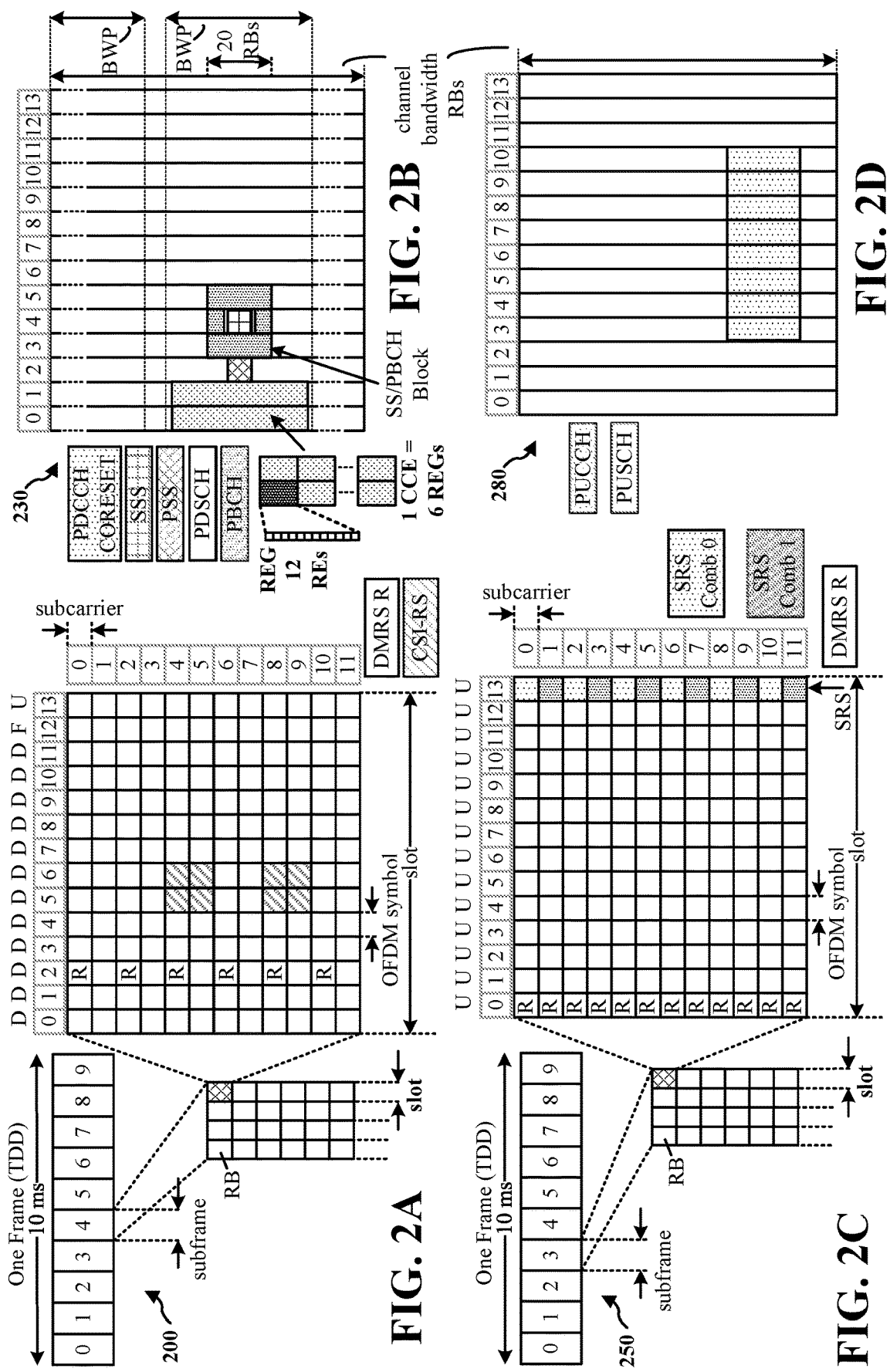
FIG. 2A is a diagram illustrating an example of a first frame, in accordance with various aspects of the present disclosure.
FIG. 2B is a diagram illustrating an example of downlink (DL) channels within a subframe, in accordance with various aspects of the present disclosure.
FIG. 2C is a diagram illustrating an example of a second frame, in accordance with various aspects of the present disclosure.
FIG. 2D is a diagram illustrating an example of uplink (UL) channels within a subframe, in accordance with various aspects of the present disclosure.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

FIGS. 2A-2D illustrate a frame structure, and the aspects of the present disclosure may be applicable to other wireless communication technologies, which may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 14 or 12 symbols, depending on whether the cyclic prefix (CP) is normal or extended. For normal CP, each slot may include 14 symbols, and for extended CP, each slot may include 12 symbols. The symbols on DL may be CP orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the CP and the numerology. The numerology defines the subcarrier spacing (SCS) and, effectively, the symbol length/duration, which is equal to 1/SCS.

| $\mu$ | SCS $\Delta f = 2^\mu \cdot 15$ [kHz] | Cyclic prefix |
| --- | --- | --- |
| 0 | 15 | Normal |
| 1 | 30 | Normal |
| 2 | 60 | Normal, Extended |
| 3 | 120 | Normal |
| 4 | 240 | Normal |

For normal CP (14 symbols/slot), different numerologies $\mu$ 0 to 4 allow for 1, 2, 4, 8, and 16 slots, respectively, per subframe. For extended CP, the numerology 2 allows for 4 slots per subframe. Accordingly, for normal CP and numerology $\mu$, there are 14 symbols/slot and $2^\mu$ slots/subframe. The subcarrier spacing may be equal to $2^\mu * 15$ kHz, where $\mu$ is the numerology 0 to 4. As such, the numerology $\mu=0$ has a subcarrier spacing of 15 kHz and the numerology $\mu=4$ has a subcarrier spacing of 240 kHz. The symbol length/duration is inversely related to the subcarrier spacing. FIGS. 2A-2D provide an example of normal CP with 14 symbols per slot and numerology $\mu=2$ with 4 slots per subframe. The slot duration is 0.25 ms, the subcarrier spacing is 60 kHz, and the symbol duration is approximately 16.67 $\mu$s. Within a set of frames, there may be one or more different bandwidth parts (BWPs) (see FIG. 2B) that are frequency division multiplexed. Each BWP may have a particular numerology and CP (normal or extended).

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgment (ACK) (HARQ-ACK) feedback (i.e., one or more HARQ ACK bits indicating one or more ACK and/or negative ACK (NACK)). The PUSCH carries data, and may additionally be used to carry a buffer status report (BSR), a power headroom report (PHR), and/or UCI.

Figure 3:
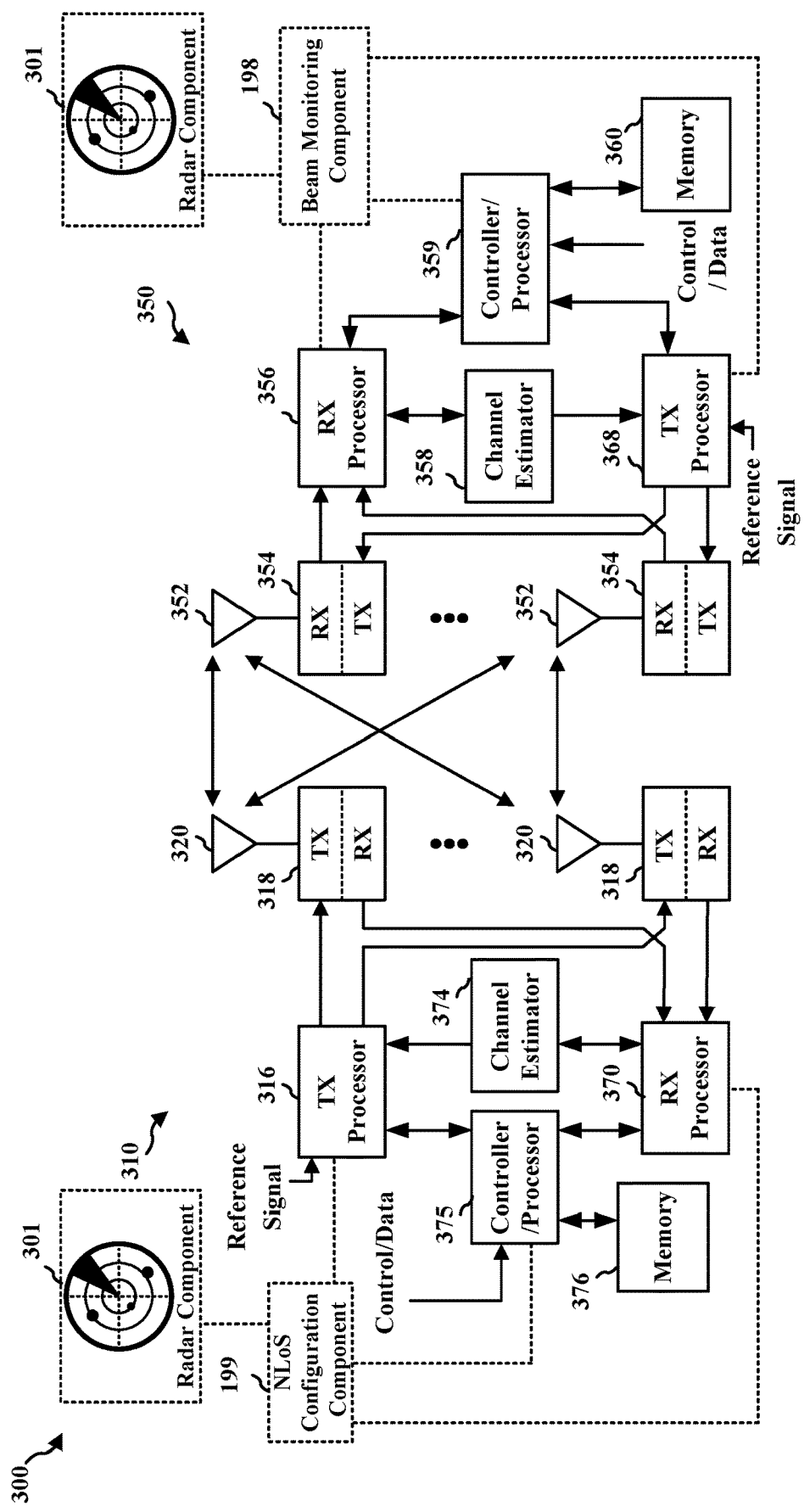
FIG. 3 is a diagram illustrating an example of a first wireless device and a second wireless device in an access network, in accordance with aspects presented herein.

FIG. 3 is a block diagram of a first wireless communication device 310 in communication with a second wireless communication device 350. In some aspects, the first wireless device may be a base station, IAB node, RSU, or other network node in an access network, and the second wireless device may be a UE. In other aspects, the first wireless device may be a UE and the second wireless device may be a UE. The communication between the devices may be based on an access link, e.g., Uu interface, or sidelink, e.g., PC5 interface. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the device 350. Each spatial stream may then be provided to a different antenna 320 via a separate transmitter 318 TX. Each transmitter 318 TX may modulate a radio frequency (RF) carrier with a respective spatial stream for transmission.

At the device 350, each receiver 354 RX receives a signal through its respective antenna 352. Each receiver 354 RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the device 350. If multiple spatial streams are destined for the device 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the device 310. These soft decisions may be based on channel estimates computed by the channel estimator 358. The soft decisions are then decoded and deinterleaved to recover the data and control signals that were originally transmitted by the device 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the device 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the device 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the device 310 in a manner similar to that described in connection with the receiver function at the device 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the device 350. IP packets from the controller/processor 375 may be provided to the EPC 160. The controller/processor 375 is also responsible for error detection using an ACK and/or NACK protocol to support HARQ operations.

At least one of the TX processor 368, the RX processor 356, and the controller/processor 359 may be configured to perform aspects in connection with the beam monitoring component 198 of FIG. 1. The device 350 may include a radar component 301, or may receive information based on measurements of the radar component 301.

At least one of the TX processor 316, the RX processor 370, and the controller/processor 375 may be configured to perform aspects in connection with the NLoS configuration component 199 of FIG. 1. The device 310 may include a radar component 301, or may receive information based on measurements of the radar component 301.

Wireless communication systems may be configured to share available system resources and provide various telecommunication services (e.g., telephony, video, data, messaging, broadcasts, etc.) based on multiple-access technologies such as CDMA systems, TDMA systems, FDMA systems, OFDMA systems, SC-FDMA systems, TD-SCDMA systems, etc. that support communication with multiple users. In many cases, common protocols that facilitate communications with wireless devices are adopted in various telecommunication standards. For example, communication methods associated with eMBB, mMTC, and ultra-reliable low latency communication (URLLC) may be incorporated in the 5G NR telecommunication standard, while other aspects may be incorporated in the 4G LTE standard. As mobile broadband technologies are part of a continuous evolution, further improvements in mobile broadband remain useful to continue the progression of such technologies.

Figure 4:
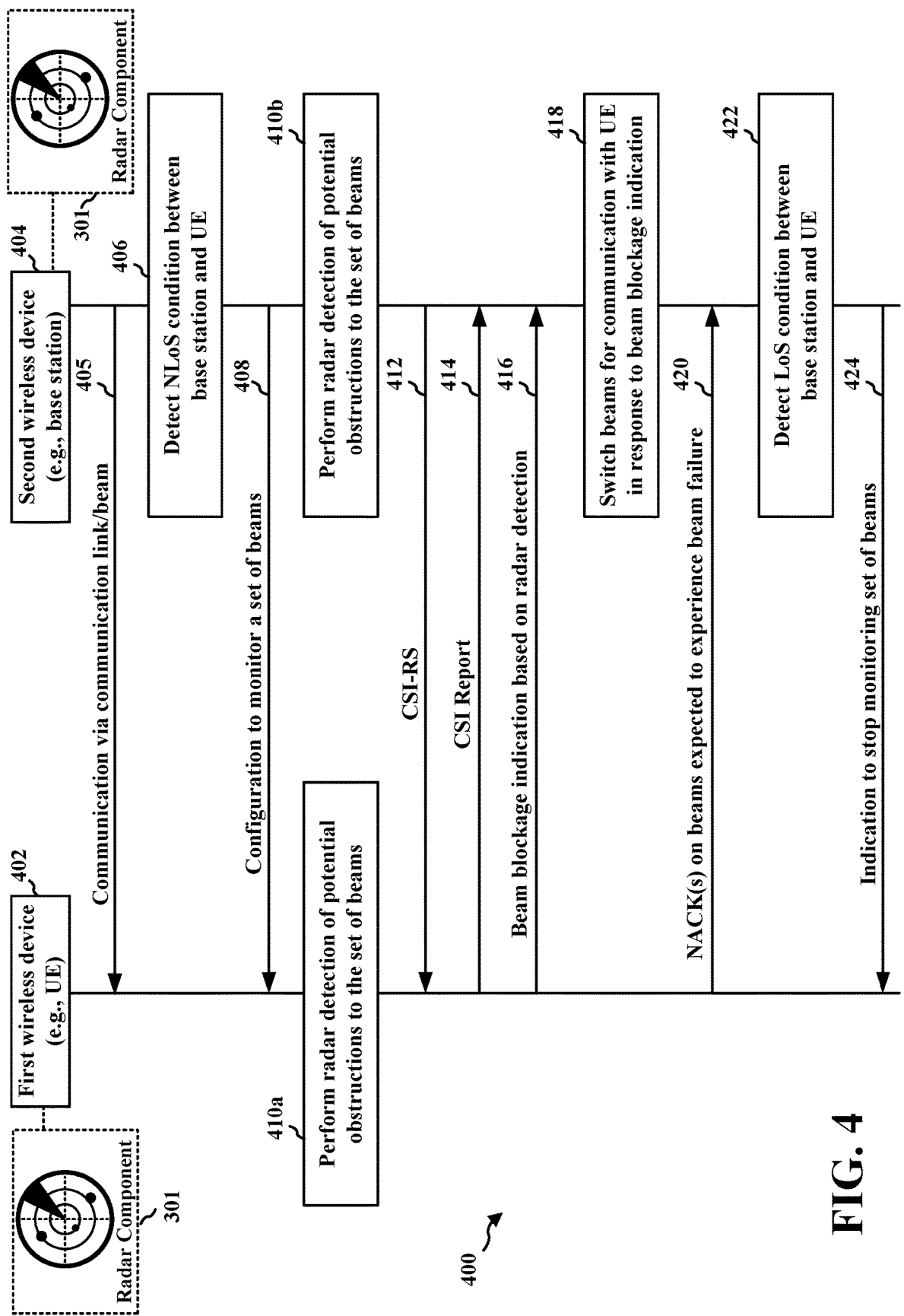
FIG. 4 is a call flow diagram illustrating communications between a first wireless device and a second wireless device, in accordance with aspects presented herein.

FIG. 4 is a call flow diagram 400 illustrating communications between a first wireless device 402 (e.g., UE) and a second wireless device 404 (e.g., base station, RSU, UE, IAB node). The first wireless device 402 and/or the second wireless device 404 may include a radar component 301 or may receive information from a radar component. The example will be described for a base station and a UE to illustrate the concept. However, the example of a base station and a UE is merely one example of a first wireless device and a second wireless device, and the aspects presented herein may be similarly applied for a second wireless device that is an RSU, an IAB node, another UE, etc., as well as for a different type of first wireless device. In some aspects, at 405, the base station (e.g., 404) may communicate with the UE (e.g., 402) via a communication link/beam, which may reflect off an object prior to a reception of the communication beam. At 406, the base station (e.g., 404) may detect a non-line-of-sight (NLoS) condition between the base station (e.g., 404) and the UE (e.g., 402). For example, the communication link between the base station (e.g., 404) and the UE (e.g., 402) may include a path that reflects off the object, such as a building, in the communication environment, such that a portion of the communication path beyond the reflection point may not be within a direct line-of-sight (LoS) of the base station (e.g., 404). At 408, the base station (e.g., 404) may transmit a configuration to the UE (e.g., 402) to monitor a set of beams associated with the NLoS portion of the communication link.

At 410a, the UE (e.g., 402) may perform radar detection of potential obstructions to the set of beams associated with the NLoS portion of the communication link. For example, and object in the communication environment, such as a vehicle, may include a trajectory that passes through the NLoS portion of the communication link and blocks/obstructs the communication link between the base station (e.g., 404) and the UE (e.g., 402). At 410*b*, the base station (e.g., 404) may perform similar radar detection of potential obstructions to the set of beams in the LoS portion of the communication link.

Figure 14:
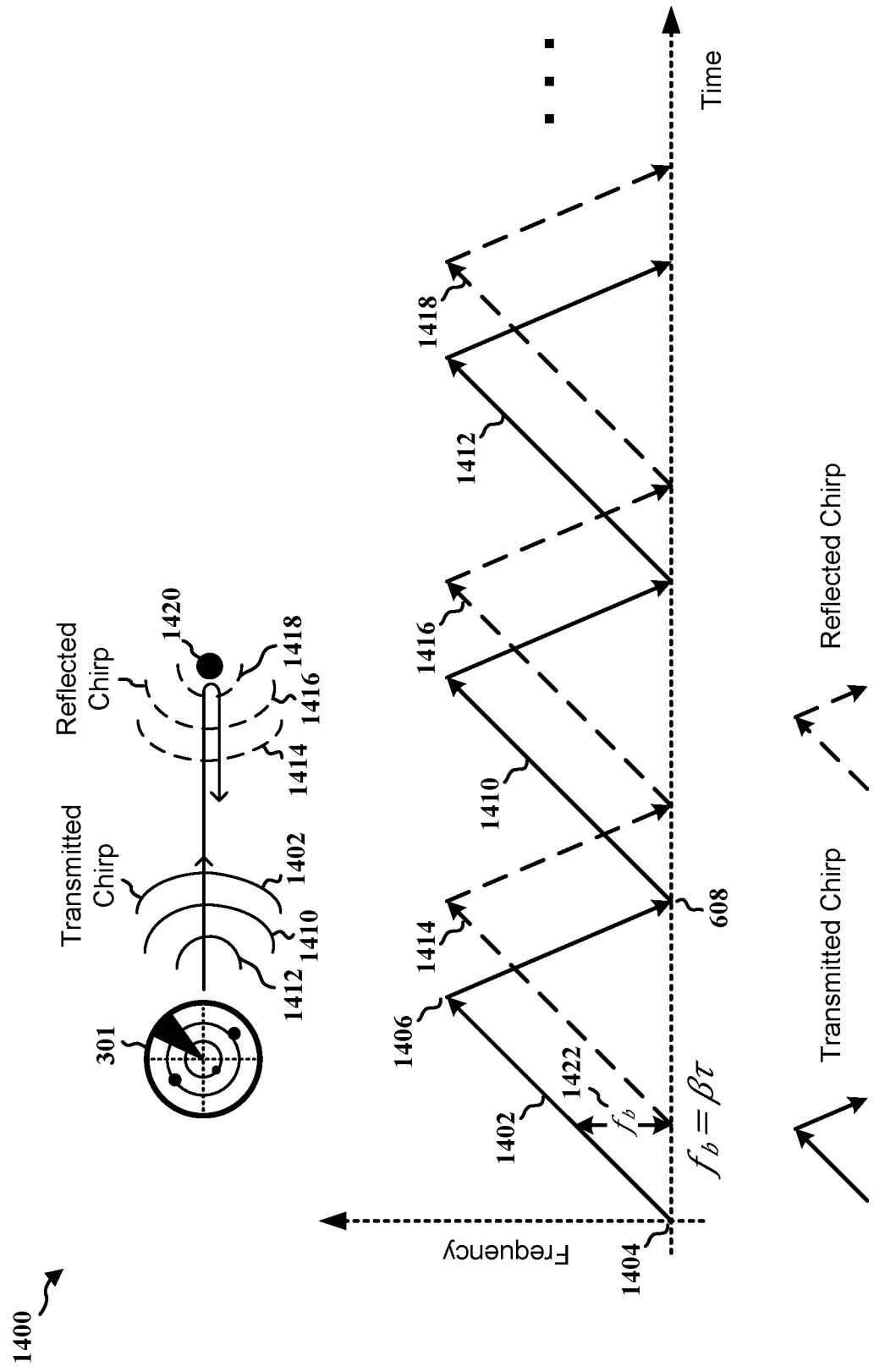
FIG. 14 illustrates example aspects of radar detection, in accordance with aspects presented herein.

Example aspects of radar detection/radar sensing are described in connection with FIG. 14. A radar component 301, which may also be referred to as a radar device, as described in connection with FIGS. 3 and 4) may transmit a radar transmission (e.g., which may also be referred to as radar waves, radar waveform, radar pulses, and/or radar signals, etc.) and measure reflections of the radar transmission to detect/sense physical objects or physical surrounding. FIG. 14 is a diagram 1400 illustrating an example of frequency modulated continuous wave (FMCW) signals generated from a radar component 301 (e.g., an FMCW radar) that may be used to measure for a beam blockage in accordance with various aspects of the present disclosure. The radar component 301 may detect/sense an object 1420 by transmitting a set of radar transmissions, which may be a set of chirp signals (or may also be referred to as a pulse signals), where each of the chirp signals may have a frequency that varies linearly (e.g., have a frequency sweeping) over a fixed period of time (e.g., over a sweep time) by a modulating signal. For example, as shown by the diagram 1400, a transmitted chirp 1402 may have a starting frequency at 1404 of a sinusoid. Then the frequency may be gradually (e.g., linearly) increased on the sinusoid until it reaches the highest frequency at 1406 of the sinusoid, and then the frequency of the signal may return to 1408 and another chirp 1410 may be transmitted in the same way. In other words, each chirp may include an increase in the frequency (e.g., linearly) and a drop in the frequency, such that the radar component 301 may transmit chirps sweeping in frequency.

After one or more chirps (e.g., chirps 1402, 1410, 1412, etc.) are transmitted by the radar component 301, the transmitted chirps may reach the object 1420 and reflect back to the radar component 301, such as shown by the reflected chirps 1414, 1416, and 1418, which may correspond to the transmitted chirps 1402, 1410, and 1412, respectively. As there may be a distance between the radar component 301 and the object 1420 and/or it may take time for a transmitted chirp to reach the object 1420 and reflect back to the radar component 301, a delay may exist between a transmitted chirp and its corresponding reflected chirp. The delay may be proportional to a range between the radar component 301 and the object 1420 (e.g., the further the target, the larger the delay and vice versa). Thus, the radar component 301 may be able to measure or estimate a distance between the radar component 301 and the object 1420 based on the delay. However, in some examples, it may not be easy for some devices to measure or estimate the distance based on the delay between a transmitted chirp and a reflected chirp.

In other examples, as an alternative, the radar component 301 may measure a difference in frequency between the transmitted chirp and the reflected chirp, which may also be proportional to the distance between the radar component 301 and the object 1420. In other words, as the frequency difference between the reflected chirp and the transmitted chirp increases with the delay, and the delay is linearly proportional to the range, the distance of the object 1420 from the radar component 301 may also be determined based on the difference in frequency. Thus, the reflected chirp from the object may be mixed with the transmitted chirp and down-converted to produce a beat signal ($f_b$) which may be linearly proportional to the range after demodulation. For example, the radar component 301 may determine a beat signal 1422 by mixing the transmitted chirp 1402 and its corresponding reflected chirp 1414. In some examples, a radar device may also be used to detect/sense the velocity and direction of a using the FMCW. For example, an FMCW receiver may be able to identify the beat frequency/range based on a range spectrum. The FMCW receiver may also be able to identify the velocity based on a Doppler spectrum and/or the direction based on a direction of arrival (DoA) spectrum with multiple chirps.

At 412, the base station (e.g., 404) may transmit a CSI-RS to the UE (e.g., 402). The CSI-RS may be transmitted on one or more beams associated with the configured set of beams to determine a quality of the one or more beams used for the communication link between the base station (e.g., 404) and the UE (e.g., 402). At 414, the UE (e.g., 402) may transmit a CSI report the base station (e.g., 404) based on the CSI-RS received, at 412. The CSI report may be indicative of the quality of the one or more beams used for the communication link between the base station (e.g., 404) and the UE (e.g., 402).

At 416, the UE (e.g., 402) may transmit an indication to the base station (e.g., 404) of an expected beam blockage in the NLoS portion of the communication link based on the radar detection performed, at 410*a*. For example, radar detection techniques performed, at 410*a*, may be used by the UE (e.g., 402) to determine that an object in the communication environment is predicted to obstruct the communication link between the base station (e.g., 404) and the UE (e.g., 402). At 418, the base station (e.g., 404) may switch beams for communicating with the UE (e.g., 402) in response to the beam blockage indication received, at 416, from the UE (e.g., 402). At 420, the UE (e.g., 402) may proactively transmit NACK(s) to the base station (e.g., 404) on the beams that are expected to experience a beam failure. The NACK(s) transmitted, at 420, may be independent of data transmissions on at least one beam of the set of configured beams.

At 422, the base station (e.g., 404) may detect a LoS condition between the base station (e.g., 404) and the UE (e.g., 402). For example, changes in the communication environment may cause the communication link with the UE (e.g., 402) to include a communication path that no longer reflects off an object within the communication environment prior to being received by the UE (e.g., 402). That is, the communication path between the base station (e.g., 404) and the UE (e.g., 402) may correspond to a direct LoS from the base station (e.g., 404). At 424, the base station (e.g., 404) may transmit an indication to the UE (e.g., 402) to stop monitoring the set of beams configured, at 408, based on the detection, at 422, of the LoS condition between the base station (e.g., 404) and the UE (e.g., 402).

Figure 5B:
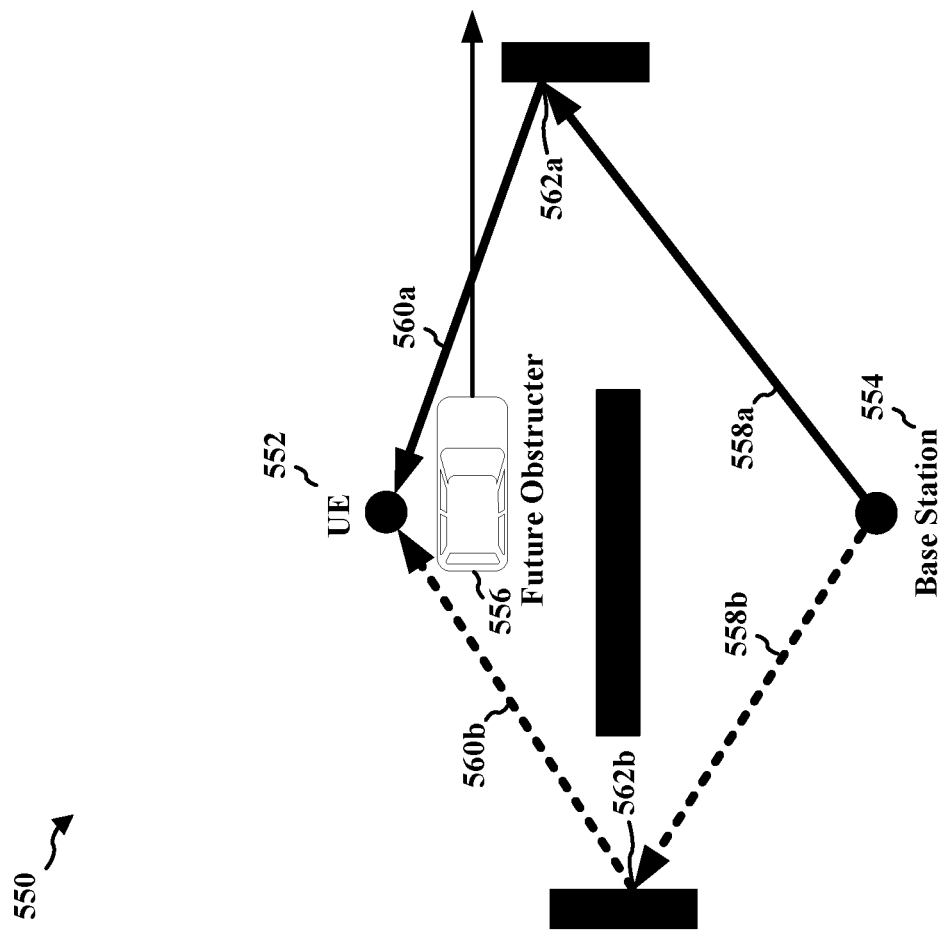
FIGS. 5A-5B illustrate diagrams of a predicted future obstruction to a communication link between a UE and a base station, in accordance with aspects presented herein.
Figure 5A:
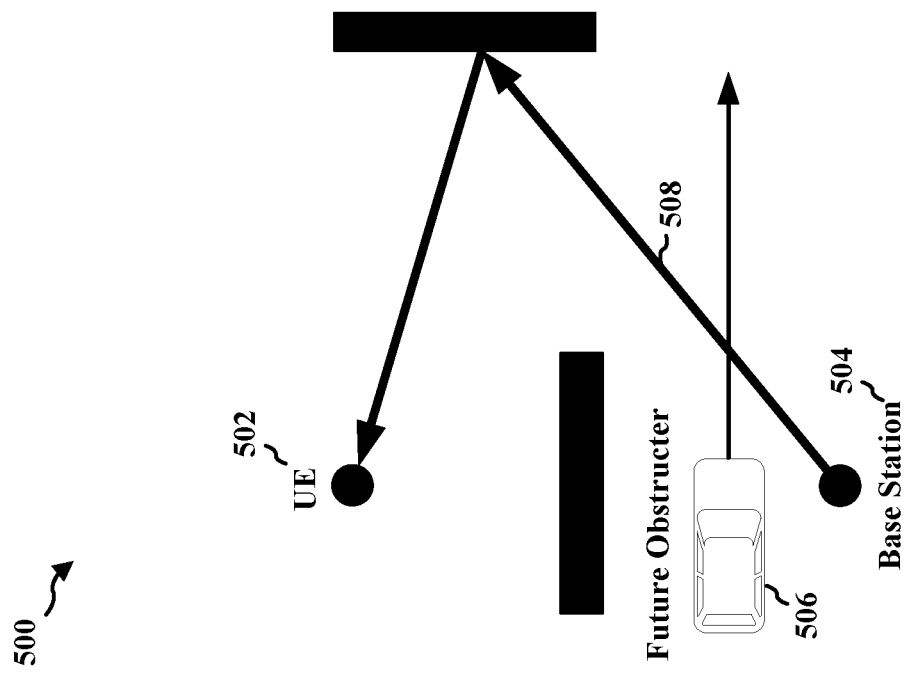

FIGS. 5A-5B illustrate diagrams 500-550 of a predicted future obstruction to a communication link between a first wireless device and a second wireless device, e.g., in accordance with aspects presented herein. The communication link may be comprised of a LoS portion 558*a*/558*b* and a NLoS portion 560*a*/560*b*, which may be separated via a reflection point 562*a*/526*b* of a beam communicated between the first wireless device and the second wireless device. Although the examples associated with the diagrams 500-550 are described for a UE 502/552 and a base station 504/554, the aspects may be similarly applied for other devices, such as an RSU and a UE, an IAB node and a UE, or a UE and a UE. In NLoS configurations, the UE 502/552 and/or the base station 504/554 may perform radar-assisted beam failure avoidance techniques to switch communication beams prior to the communication link between the UE 502/552 and the base station 504/554 becoming obstructed. For example, the base station 554 may switch from the communication link comprised of the LoS portion 558a and the NLoS portion 560a to a second communication link comprised of a second LoS portion 558b and a second NLoS portion 560b.

FIG. 5A illustrates that the base station 504 may be able to detect a future obstructer 506 that is moving in a direction to block a beam (e.g., direction 508) used for communication with a UE 502. FIG. 5B illustrates that there may be obstructions (e.g., future obstructer 556) that are not detectable by the base station 554, which may be detected by the UE 552 that will block directional communication with the UE 552. The UE 502/552 and/or the base station 504/554 may be configured to sense that a beam of a communication link is going to become blocked/obstructed by a future obstructer 506/556 before the blocking/obstruction actually occurs. Equipping the base station 504/554 or the UE 502/552 (e.g., a vehicle) with a radar may provide information that can be leveraged to improve connectivity between devices. Such techniques may be referred to as joint communication-radar techniques. Radar sensing may provide information that may be used to generate a prediction about communications within the environment and may be used to improve communication performance between devices.

Radar information indicative of a predicted future obstruction 506/556 to the communication link between the UE 502/552 and the base station 504/554 may be used to allow the base station 504/554 to improve beam management and/or link reliability in dynamic environments, such as vehicular networks. As conditions of vehicular networks may change rapidly when vehicles are moving at high speeds, some beam management approaches, such as reactive beam management procedures, may have limited applicability. For example, some beam management procedures may not be proactive in regard to the predicted obstructions 506/556, but rather may be reactive to an obstruction that has already occurred. Beam management techniques may include determining one or more beams to use for the communication link between the UE 502/552 and the base station 504/554, beam tracking procedures, detection of beam failures, beam recovery procedures, etc.

Radar devices may be configured to adapt to communication environments that include sudden changes in conditions based on reactive beam management procedures that are triggered in response to determining that a beam is blocked. For example, the UE 502/552 and the base station 504/554 may communicate over a particular beam and a vehicle (e.g., obstructer 506/556) may pass through the path of a communication link between the UE 502/552 and the base station 504/554, which may obstruct/block the communication link. In some cases, the obstructer 506/556 may cause a beam failure between the UE 502/552 and the base station 504/554. The UE 502/552 may detect a radio link failure (RLF) and may attempt to perform a beam failure recovery (BFR). That is, the UE 502/552 may first detect that the beam has failed and subsequently attempt to recover from the failure caused by the obstructer 506/556.

Configuring devices in the communication environment to sense sidelink information, such as radar communications, may improve beam management procedures in dynamic communication environment. In less-dynamic environments, objects may be moving more slowly, such that there may be enough latency for the devices to adapt to changes based on reactive beam management techniques. However, in fast changing environments where latency is low, proactive beam management techniques may be implemented to predict future obstructions and switch beams, as illustrated in the diagram 550, before a beam becomes blocked/obstructed. In some cases, the signal quality of backup beams being (e.g., the communication link comprised of the second LoS portion 558b and the second NLoS portion 560b) tracked by the devices in the communication environment may also change. If an RLF occurs, information about the backup beams may not be reliable. Thus, a vehicle (e.g., UE 502/552) may determine that a beam failure or a backup beam failure has occurred, which may be associated with an extended reaction time to perform the BFR. Accordingly, radar information may be leveraged to assist the UE 502/552 and the base station 504/554 in avoiding predicted beam failures.

The base station 504/554 may be equipped with a radar device that may be used to determine information about the communication environment within a LoS of the radar device. Radar sensing performed at the base station 504/554 may be limited to LoS portions 558a/558b of the communication link from the base station 504/504 to the UE 502/552. That is, the base station 504/554 may only detect/predict future obstructions, such as the obstructer 506, that are within the LoS of the base station 504/554 and may not be able to detect/predict future obstructions, such as the obstructer 556, that are not within the LoS of the base station 504/554. The NLoS portion 560a/560b refers to the portion of the beam after the reflection point 562a/562b that has a changed beam direction from the LoS portion 558a/558b. The base station 504/554 may still communicate with the UE 502/552 based on the beam being reflected and received by the UE 502/552. However, the base station 504/554 may only be able to predict future obstructions up to the reflection point 562a/526b of the beam (e.g., within the LoS portion 558a/558b of the communication link). The base station 504/554 may not be able to sense objects in the environment beyond the reflection point 562a/562b of the beam (e.g., corresponding to the NLoS portion 560a/560b of the communication link). Thus, the radar at the base station 504/554 may not be able to detect changes in the environment that occur behind objects in the NLoS portion 560a/560b of the communication link.

Equipping both the base station 504/554 and the UE 502/552 (e.g., a vehicle) with a radar device may allow the base station 504/554 and the UE 502/552 to receive additional information about the communication environment, particularly in regions that may be associated with NLoS portions 560a/560b of the communication link for one of the devices. For example, a NLoS portion 560a/560b of the communication link for the base station 504/554 may correspond to a LoS perspective of the communication link for the UE 502/552. Thus, even though the base station 554 may not be configured to sense the future obstructer 556 in the NLoS portion 560a/560b of the communication link, the base station 554 may receive information from the UE 552 indicative of the future obstructer 556 and may use such information to adjust one or more communication beams. The UE 552 may transmit LoS information determined from a local radar back to the base station 554, so that the base station 554 may initiate adjustments to the communication link over a short period of time based on expected/predicted failures of the beam/communication link.

In the diagram 500, a radar device located at the base station 504 may be able to detect the future obstructer 506 located in the LoS of the base station 504. That is, the radar at the base station 504 may be able to predict a future time and location where an obstruction may occur to a current serving beam. The communication link between the base station 504 and the UE 502 also includes a NLoS portion, although the future obstructer 506 is predicted to pass through the LoS portion of the communication link. The future obstructer 506 may be another vehicle that is predicted to cross the path of the beam being used to communicate with the UE 502 and potentially block the beam. The base station 504 may detect the obstructer 506 in advance based on the obstruction occurring in the LoS of the base station 504. If the base station 504 detects the obstructer 506 in advance, the base station 504 may proactively switch to an alternate beam for the time period that the communication link is obstructed by the obstructer 506.

In the diagram 550, the radar device located at the base station 554 may not be able to detect the future obstructer 556 in advance, as the future obstructer 556 may be located in the NLoS portion 560a of the communication link. However, a radar device located at the UE 552 may be configured to detect the future obstructer 556 and predict a future time and location that the obstruction is expected to occur. That is, the radar device located at the UE 552 may be able to predict that the NLoS portion 560a of the current serving beam for the base station 554 is going to become blocked/obstructed. If the obstruction is associated with the NLoS portion 560a of the communication link for the base station 554, the base station 554 may not be able to sense/predict the obstruction in advance, as the base station 554 may not have direct sensing of the future obstructer 556. Thus, direct sensing by the base station 554 may not be used for proactive beam management techniques in such cases. However, the base station 554 may be in communication with one or more UEs, such as the UE 552, which may communicate NLoS information to the base station 554. By receiving the NLoS information from the one or more UEs, the base station 554 may be able to determine/predict future obstructions that are expected to occur in the NLoS portion 560a of the communication link, as well as sense the LoS portion 558a of the communication link for predicting obstructions that may occur in the LoS portion 558a of the communication link. Based on the prediction, the base station 554 may switch from the beam associated with the communication link comprised of the first LoS portion 558a and the first NLoS portion 560a to a different beam associated with a second communication link comprised of a second LoS portion 558b and a second NLoS portion 560b.

Figure 6:
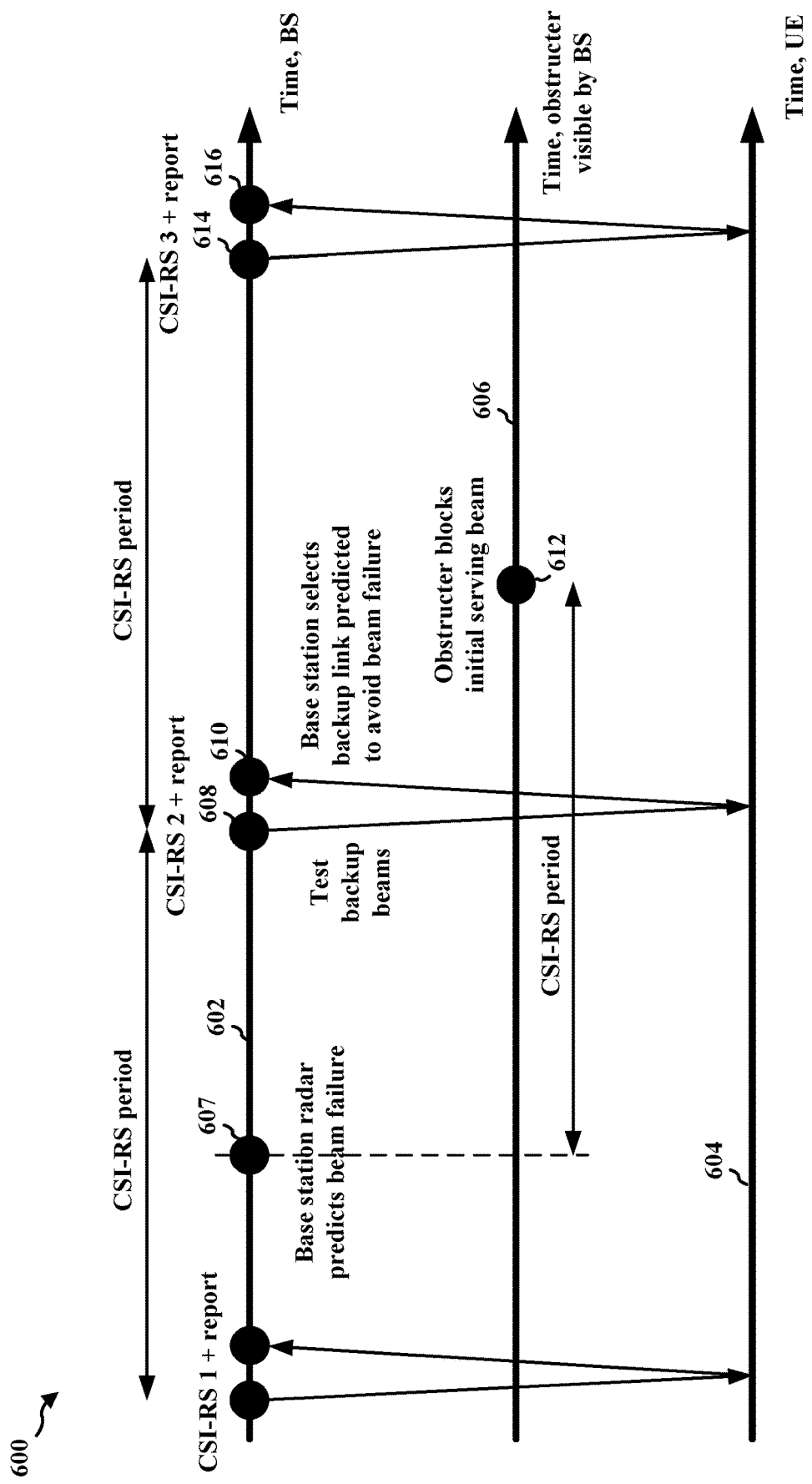
FIG. 6 illustrates a diagram associated with an obstruction that occurs within a line-of-sight (LoS) portion of a communication link of a base station, in accordance with aspects presented herein.

FIG. 6 illustrates a time diagram 600 associated with an obstruction that occurs within a LoS portion of a communication link of a base station. The base station may correspond to the base station 504, and the UE may correspond to the UE 502, and the obstructer may correspond to the obstructer 506 in FIG. 5A. FIG. 6 illustrates the radar-assisted beam failure avoidance techniques based on radar detection at the base station. The base station may use NLoS beam directions to communicate with the UE. FIG. 6 illustrates a timeline 602 from a perspective of the base station, a timeline 604 from a perspective of the UE, and a timeline 606 from a perspective of an obstructer.

For each object detected by the radar located at the base station, the base station may predict a location of the object for a CSI-RS period or for an SSB period, and may determine whether the object is expected to block/obstruct a beam in a set of configured beams (e.g., serving beams or alternate beams) from a LoS viewpoint of the base station (e.g., blockages that occur between the base station and the reflection point of the communication link associated with the Tx beam direction of the base station). If the object is predicted to block the serving beam, e.g., at 607, the base station may schedule CSI-RS in the directions of the backup/alternate beams that the base station predicts to be available after the CSI-RS period. For example, at 608, the base station may transmit CSI-RS, and at 610, the base station may receive CSI from the UE based on measurement of the CSI-RS. If the UE reports a strong RSRP in a tested CSI-RS direction, the base station may switch to a backup/alternate link reported by the UE, which may avoid a beam failure between the UE and the base station, e.g., when the obstructer blocks the previous beam, at 612.

In the diagram 600, the base station may configure a CSI-RS 1 for a first CSI-RS period. The base station may transmit the CSI-RS 1 to the UE, which may send a report back to the base station indicative of a channel quality associated with the CSI-RS 1. While the base station may select an initial serving beam based on the report received from the UE, the base station may subsequently determine based on local sensing of the base station that a LoS portion of the communication link is expected to be blocked by an obstructer. For example, the radar device located at the base station may predict that a beam failure is expected to occur within one CSI-RS period based on a detected obstructer blocking the initial serving beam.

Prior to the initial serving beam becoming blocked, the base station may test a backup beam associated with a different beam direction by transmitting a CSI-RS 2 to the UE for a second CSI-RS period. The UE may send a report back to the base station indicative of a channel quality associated with the CSI-RS 2. Based on the report received from the UE, the base station may select a backup link that is predicted to avoid the beam failure caused by the obstructer blocking the initial serving beam. That is, the base station may determine whether another beam direction is expected to be free of blockages/obstructions. If the other beam direction is not expected to be blocked, the base station may switch to the alternate beam prior to the initial serving beaming becoming blocked via the predicted obstructer. Accordingly, before the obstruction to the initial serving beam occurs and potentially causes a beam failure to the initial serving beam, the base station may select a backup beam that is not predicted to fail and may use the backup beam to communicate with the UE, such that a beam failure event may be avoided. At the end of the second CSI-RS period, the base station may transmit a CSI-RS 3 to the UE, at 614, and receive an associated report from the UE, at 616. The report may be indicative of whether the base station may switch back to the initial serving beam or switch to another beam for communicating with the UE.

Figure 7:
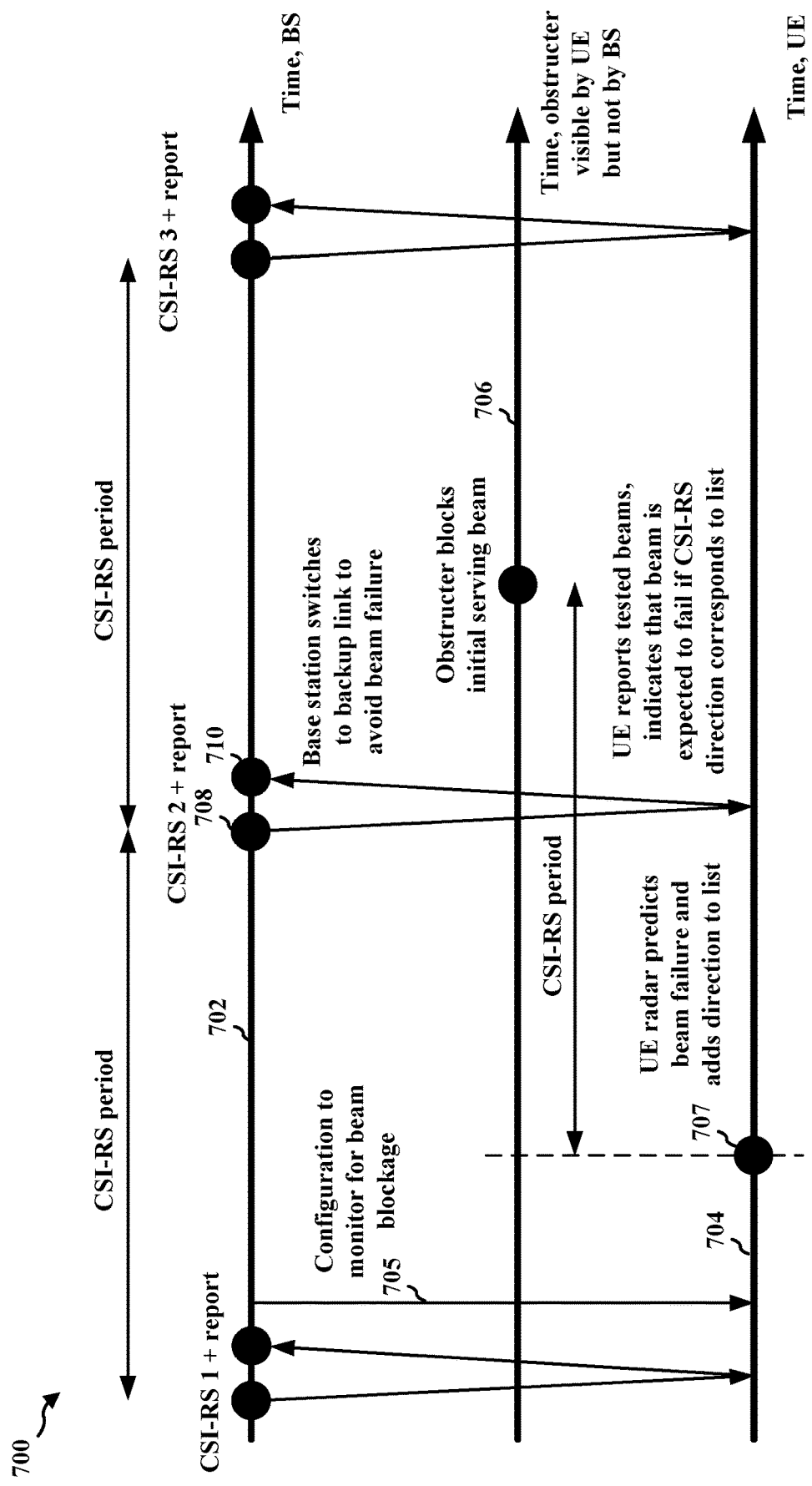
FIG. 7 illustrates a diagram associated with an obstruction that occurs within a non-line-of-sight (NLoS) portion of a communication link of a base station, in accordance with aspects presented herein.

FIG. 7 illustrates a diagram 700 associated with an obstruction that occurs within a NLoS portion of a communication link of a base station. The base station may correspond to the base station 554, the UE may correspond to the UE 552, and the obstructer may correspond to the obstructer 556 in FIG. 5B. The UE may receive a configuration 705 from the base station for a set of SSB/CSI-RS beams to monitor for beam blockages/obstructions from a LoS viewpoint of the UE. The UE may continuously tracks the environment for blockages/obstructions in the LoS portion of the communication link, which may correspond to a NLoS portion of the communication link from a viewpoint of the base station. FIG. 7 illustrates a timeline 702 from a perspective of the base station, a timeline 704 from a perspective of the UE, and a timeline 706 from a perspective of an obstructer.

For each object detected by the radar device located at the UE, the UE may predict a location of the object for a CSI-RS period or for an SSB period, and may determine whether the object is expected to block/obstruct a beam in the set of configured beams (e.g., serving beams or alternate beams) from the LoS viewpoint of the UE (e.g., blockages that occur between the UE and the reflection point of the communication link). Thus, before a beam blockage occurs in the NLoS portion of the communication link, the base station may predict which beams in the set of beams will be blocked via information received from the UE.

If an object is predicted to block a serving beam, e.g., at 707, the UE may add the corresponding beam direction to a list of beam directions that are expected to fail when transmitting the report to the base station. At the time the UE receives an SSB or a CSI-RS, the UE may also report a proactive NACK in each beam direction included in the list of beam directions that are expected to fail. Such feedback may be utilized for performing proactive beam management techniques by the base station. When the CSI-RS 708 is transmitted, the UE may report a current CSI 710, or an RSRP, to the base station in addition to transmitting an indication that a particular beam is expected to be blocked/obstructed at a future time.

The base station may switch to a backup link reported by the UE to avoid a potential beam failure. Combining information sensed by both the base station and the UE may allow the base station to predict and avoid beam failures that result from obstructers in the LoS of either the base station or the UE. Thus, the base station may instruct the UE to perform beam tracking for certain beams in addition to performing beam blockage predictions. The UE may utilize local sensing to perform beam blockage predictions for the set of beams the base station has instructed the UE to monitor.

If the UE determines that a beam is expected to be blocked, the UE may transmit an indication/report to the base station for the corresponding beam. As such, the base station may perform proactive beam management techniques based on the configuration of the UE by the base station. For certain beams, the base station may be able to perform LoS sensing, such that the UE may not have to monitor such beams. Thus, local sensing at the base station may be used to predict beam blockages in such cases. However, in NLoS portions of the communication link, the base station may rely on the UE to report expected blockages for adapting the beams that are used in association with the communication link.

In the diagram 700, the base station may configure the UE to monitor for future obstructions in the NLoS portion of the communication link of the base station. The base station may configure the UE to monitor for obstructions/blockages via one or more SSB/CSI-RS beams (e.g., serving beams or alternate beams tracked by the base station). The UE may report blockage predictions to the base station for the associated beams. The base station may continuously track the environment and configure the UE with a set of SSB/CSI-RS beams to monitor for beam blockages from a LoS viewpoint of the UE (e.g., blockages that occur between the UE and a reflection point of the communication link associated with the Rx beam of the UE).

The base station may transmit a CSI-RS 1 to the UE for a first CSI-RS period. Based on the CSI-RS 1, the UE may transmit a report back to the base station indicative of a channel quality associated with the serving beam used for the communication link between the UE and the base station.

Prior to an end of the first CSI-RS period, the radar device located at the UE may predict that a beam failure is expected to occur within one CSI-RS period based on a detected obstructer blocking the initial serving beam in the NLoS portion of the communication link. The UE may add the beam direction associated with the obstruction to a list of beam failure directions reported to the base station. Before the initial serving beam becomes blocked, the base station may transmit a CSI-RS 2 to the UE for a second CSI-RS period. The UE may test the beams associated with the CSI-RS 2, such as backup/alternate beams, and indicate whether the backup/alternate beams are expected to fail. For example, if the CSI-RS direction corresponds to a beam direction associated with the list of beam failure directions, the UE may report to the base station that the beam is expected to fail.

The base station may utilize the information reported from the UE to change the communication beam and adapt to the conditions of the communication environment. For example, the base station may switch to a backup link to avoid a beam failure based on the report received from the UE. Thus, when the obstructer blocks the initial serving beam between the base station and the UE, the beam for the communication link between the UE and the base station may have already been proactively switched to a different beam to avoid a beam failure. At the end of the second CSI-RS period, the base station may transmit a CSI-RS 3 to the UE and receive an associated report from the UE. The report may be indicative of whether the base station may switch back to the initial serving beam or switch to another beam for communicating with the UE.

Figure 8:
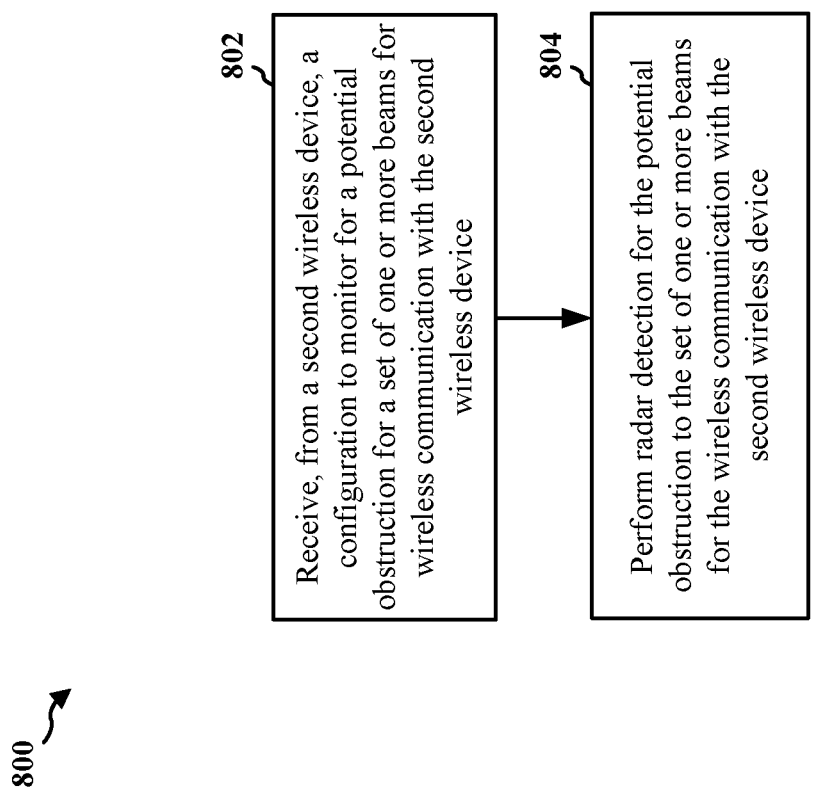
FIG. 8 is a flowchart of a method of wireless communication at a first wireless device, in accordance with aspects presented herein.

FIG. 8 is a flowchart 800 of a method of wireless communication. The method may be performed by a first wireless device, e.g., 350, 402; the apparatus 1202, which may include the memory 360, the TX processor 368, the RX processor 356, and/or the controller/processor 359. In some aspects, the first wireless device may be a UE, a component of a UE, or may implement UE functionality (e.g., the UE 104, 502, 552, etc.). The method may enable a device to configure another device to obtain more comprehensive information about potential beam blockages by configuration another device to monitor for beam blockages from the other device's perspective and to report potential beam blockages. The method may enable more reliable wireless communication by enabling beam adjustments to account for blockages that may be detected at the first wireless device and not the second wireless device. In some aspects, the method may be performed to avoid beam failures associated with NLoS obstructions to a communication link.

At 802, the first wireless device may receive, from a second wireless device, a configuration to monitor for a potential obstruction for a set of one or more beams for wireless communication with the second wireless device. In some aspects, the configuration may be for a UE in a NLOS condition with a base station, or for another wireless device in an NLOS condition with a second wireless device. The first wireless device may be a UE, and the second wireless device may be a base station, an RSU, an IAB node, or another UE. For example, referring to FIG. 4, the wireless device 402 may receive, at 408, a configuration from the second wireless device 404 to monitor a set of beams based on detection, at 406, of a NLoS condition between the second wireless device 404 and the wireless device 402. The reception, at 802, may be performed by the reception component 1230 of the apparatus 1202 in FIG. 12.

At 804, the first wireless device may perform radar detection for the potential obstruction to the set of one or more beams for the wireless communication with the second wireless device. For example, referring to FIG. 4, the wireless device 402 may perform, at 410a, radar detection of potential obstructions to the set of beams configured, at 408, based on the configuration. In some aspects, the radar detection may be based on a NLoS condition between the second wireless device 404 and the wireless device 402. The performance, at 804, may be performed by the performance component 1240 of the apparatus 1202 in FIG. 12.

Figure 9:
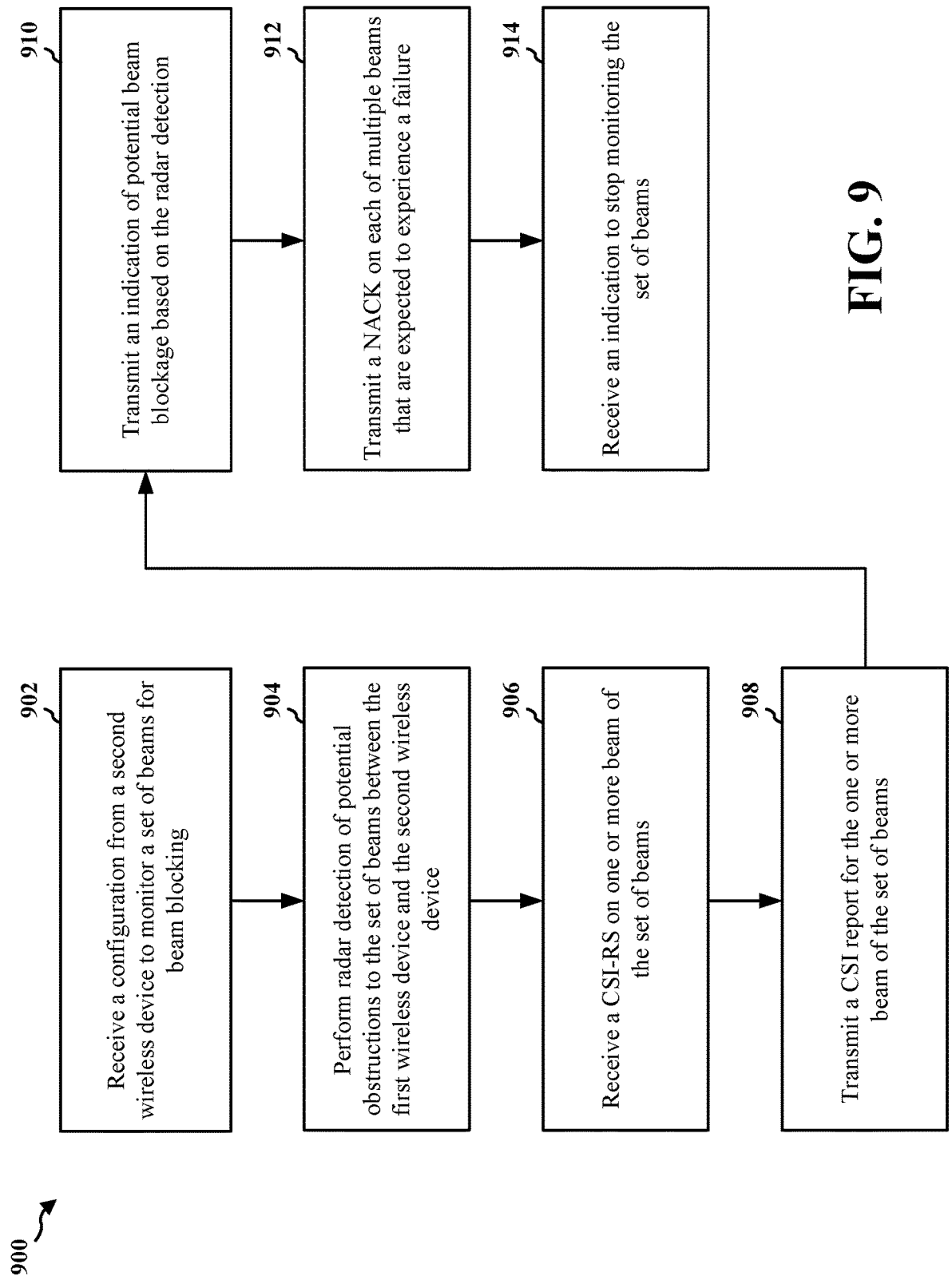
FIG. 9 is a flowchart of a method of wireless communication at a first wireless device, in accordance with aspects presented herein.

FIG. 9 is a flowchart 900 of a method of wireless communication. The method may be performed by a UE (e.g., the UE 104, 502, 552; device 402; the apparatus 1202; etc.), which may include the memory 360 and which may be the entire or a component of the UE, such as the TX processor 368, the RX processor 356, and/or the controller/processor 359. The method may be performed to avoid beam failures associated with NLoS obstructions to a communication link.

At 902, the first wireless device may receive a configuration from a second wireless device to monitor a set of beams for beam blocking with the second wireless device. For example, referring to FIG. 4, the first wireless device 402 may receive, at 408, a configuration from the second wireless device 404 to monitor a set of beams based on detection, at 406, of a NLoS condition between the second wireless device 404 and the first wireless device 402. Each beam of the set of beams configured, at 408, may be associated with an SSB or each beam of the set of beams configured, at 408, may be associated with a CSI-RS. The reception, at 902, may be performed by the reception component 1230 of the apparatus 1202 in FIG. 12.

At 904, the first wireless device may perform radar detection of potential obstructions to the set of beams between the second wireless device and the first wireless device. For example, referring to FIG. 4, the first wireless device 402 may perform, at 410a, radar detection of potential obstructions to the set of beams configured, at 408, based on the configuration. The performance, at 904, may be performed by the performance component 1240 of the apparatus 1202 in FIG. 12.

At 906, the first wireless device may receive a CSI-RS on one or more beam of the set of beams. For example, referring to FIG. 4, the first wireless device 402 may receive, at 412, a CSI-RS from the second wireless device 404. The reception, at 906, may be performed by the reception component 1230 of the apparatus 1202 in FIG. 12.

At 908, the first wireless device may transmit a CSI report for the one or more beam of the set of beams. For example, referring to FIG. 4, the first wireless device 402 may transmit, at 414, a CSI report to the second wireless device 404 based on the CSI-RS received, at 412. The transmission, at 908, may be performed by the transmission component 1234 of the apparatus 1202 in FIG. 12.

At 910, the first wireless device may transmit, to the second wireless device, an indication of potential beam blockage based on the radar detection. For example, referring to FIG. 4, the first wireless device 402 may transmit, at 416, a beam blockage indication to the second wireless device 404 based on the radar detection performed, at 410a, by the first wireless device 402. The indication transmitted, at 416, may comprise a list of one or more beams that are expected to experience a failure. The transmission, at 910, may be performed by the transmission component 1234 of the apparatus 1202 in FIG. 12.

At 912, the first wireless device may transmit a NACK on each of multiple beams that are expected to experience a failure. For example, referring to FIG. 4, the first wireless device 402 may transmit, at 420, NACK(s) on beams that are expected to experience a beam failure. The indication transmitted, at 420, may comprise NACK(s) that are independent of a data transmission on at least one beam of the set of beams. The transmission, at 912, may be performed by the transmission component 1234 of the apparatus 1202 in FIG. 12.

At 914, the first wireless device may receive an indication from the second wireless device to stop monitoring the set of beams. For example, referring to FIG. 4, the first wireless device 402 may receive, at 424, an indication from the second wireless device 404 to stop monitoring the set of beams configured, at 408, by the second wireless device 404. The reception, at 914, may be performed by the reception component 1230 of the apparatus 1202 in FIG. 12.

Figure 10:
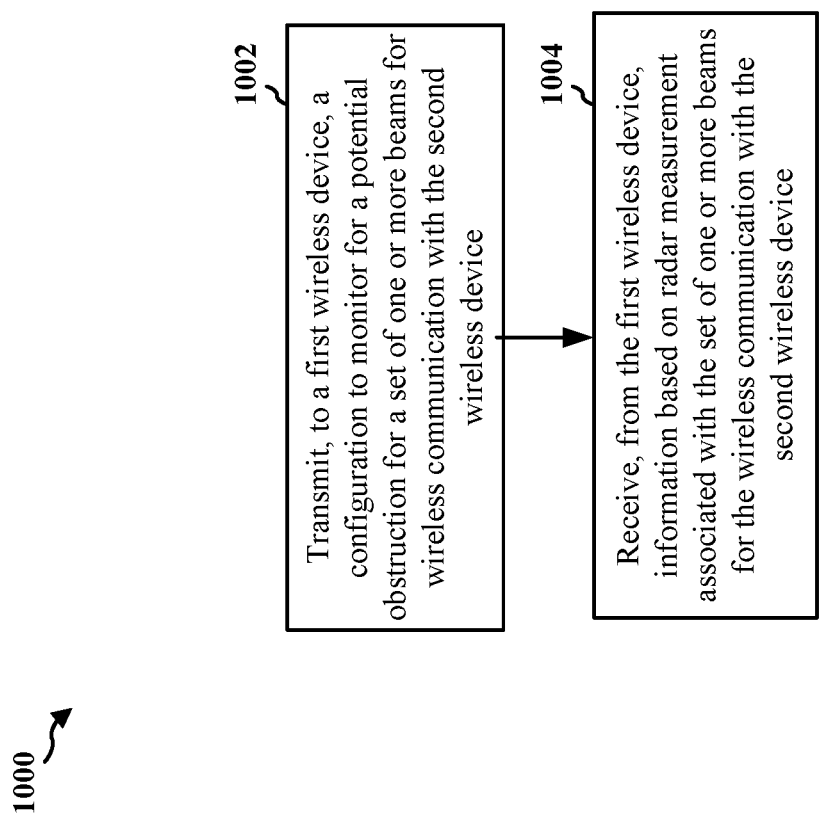
FIG. 10 is a flowchart of a method of wireless communication at a second wireless device, in accordance with aspects presented herein.

FIG. 10 is a flowchart 1000 of a method of wireless communication. The method may be performed by a second wireless device (e.g., device 310; the apparatus 1302). In some aspects, the method may be performed by a base station (e.g., the base station 102, 180, 504, 554; device 404, etc.). In some aspects, the method may be performed by a UE based on sidelink communication with another UE. In some aspects, the method may be performed by an RSU, an IAB node, etc. The method may be performed by the device 310, which may include the memory 376 and which may be the entire device or a component of the device, such as the TX processor 316, the RX processor 370, and/or the controller/processor 375. The method may be performed to avoid beam failures associated with NLoS obstructions to a communication link.

At 1002, the second wireless device may transmit, to a first wireless device, a configuration to monitor for a potential obstruction for a set of one or more beams for wireless communication with the second wireless device. The first wireless device may be a UE, and the second wireless device may be a base station, an IAB node, an RSU, or another UE. For example, referring to FIG. 4, the second wireless device 404 may transmit, at 408, a configuration to the first wireless device 402 to monitor a set of beams based on the NLoS condition detected, at 406, between the second wireless device 404 and the first wireless device 402. The configuration transmitted, at 408, may be for radar detection of potential obstructions to the set of beams between the second wireless device 404 and the first wireless device 402. The transmission, at 1004, may be performed by the transmission component 1334 of the apparatus 1302 in FIG. 13.

At 1004, the second wireless device may receive, from the first wireless device, information based on radar measurement associated with the set of one or more beams for the wireless communication with the second wireless device. The reception may be performed, e.g., by the reception component 1330 and/or the indication component 1346 of the apparatus 1302 in FIG. 13. For example, the second wireless device may receive an indication of a potential beam blockage based on radar measurements at the first wireless device.

Figure 11:
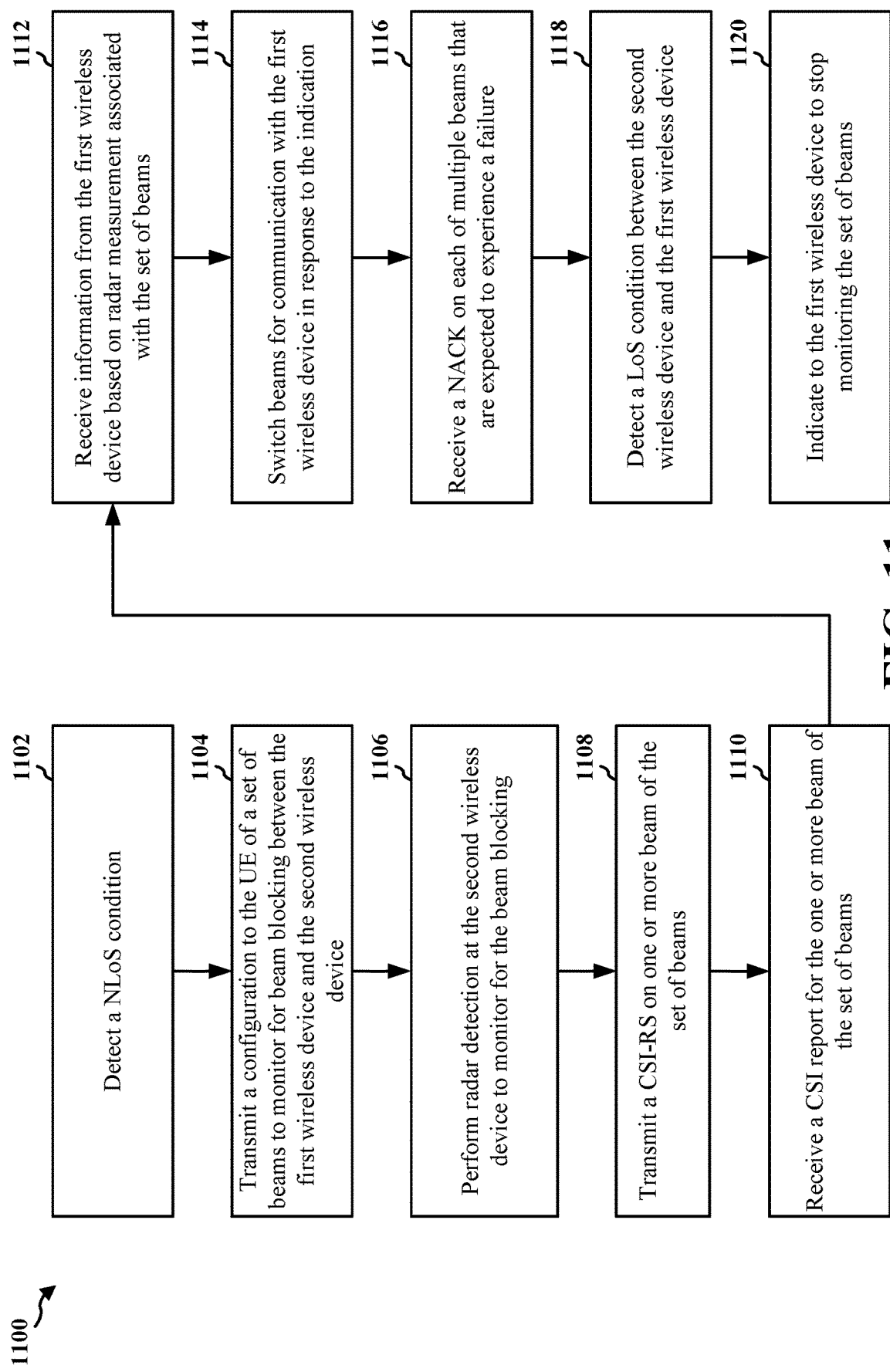
FIG. 11 is a flowchart of a method of wireless communication at a second wireless device, in accordance with aspects presented herein.

FIG. 11 is a flowchart 1100 of a method of wireless communication. The method may be performed by a second wireless device (e.g., the base station 102, 180, 504, 554; the device 404; the apparatus 1302; etc.), which may include the memory 376 and which may be the entire base station or a component of the base station, such as the TX processor 316, the RX processor 370, and/or the controller/processor 375. The method may be performed to avoid beam failures associated with NLoS obstructions to a communication link.

At 1102, the second wireless device may detect a NLoS condition between a second wireless device and a first wireless device. For example, referring to FIG. 4, the second wireless device 404 may detect, at 406, a NLoS condition between the second wireless device 404 and the first wireless device 402. The first wireless device may be a UE, and the second wireless device may be a base station, an RSU, an IAB node, another UE, etc. The detecting, at 1102, may be performed by the detection component 1340 of the apparatus 1302 in FIG. 13. The first wireless device may be a UE, and the second wireless device may be a base station, an IAB node, an RSU, or another UE.

At 1104, the second wireless device may transmit a configuration to the first wireless device of a set of beams to monitor for beam blocking in response to the NLOS condition between the second wireless device and the first wireless device. For example, referring to FIG. 4, the second wireless device 404 may transmit, at 408, a configuration to the first wireless device 402 to monitor a set of beams based on the NLoS condition detected, at 406, between the second wireless device 404 and the first wireless device 402. The configuration transmitted, at 408, may be for radar detection of potential obstructions to the set of beams between the second wireless device 404 and the first wireless device 402. Each beam of the set of beams configured, at 408, may be associated with an SSB or each beam of the set of beams configured, at 408, may be associated with a CSI-RS. The transmission, at 1104, may be performed by the transmission component 1334 of the apparatus 1302 in FIG. 13.

At 1106, the second wireless device may perform radar detection at the second wireless device to monitor for the beam blocking from a first perspective of the second wireless device—the configuration configures the first wireless device to monitor for the beam blocking from a second perspective of the first wireless device. For example, referring to FIG. 4, the second wireless device 404 may perform, at 410b, radar detection of potential obstructions to the set of beams (e.g., within the LoS of the second wireless device 404). The radar detection performed, at 410a, may be performed for potential obstructions to the set of beams at locations that are not within the LoS of the second wireless device 404. The performance, at 1106, may be performed by the performance component 1342 of the apparatus 1302 in FIG. 13.

At 1108, the second wireless device may transmit a CSI-RS on one or more beam of the set of beams. For example, referring to FIG. 4, the second wireless device 404 may transmit, at 412, a CSI-RS to the first wireless device 402. The transmission, at 1108, may be performed by the transmission component 1334 of the apparatus 1302 in FIG. 13.

At 1110, the second wireless device may receive a CSI report for the one or more beam of the set of beams. For example, referring to FIG. 4, the second wireless device 404 may receive, at 414, a CSI report from the first wireless device 402 based on the CSI-RS transmitted, at 412, from the second wireless device 404 to the first wireless device 402. The reception, at 1110, may be performed by the reception component 1330 of the apparatus 1302 in FIG. 13.

At 1112, the second wireless device may receive information from the first wireless device based on radar measurement associated with the set of beams. For example, the second wireless device may receive, from the first wireless device, an indication of a potential beam blockage. For example, referring to FIG. 4, the second wireless device 404 may receive, at 416, a beam blockage indication from the first wireless device 402 based on the radar detection performed, at 410a. The indication transmitted, at 416, may comprise a list of one or more beams that are expected to experience a failure. The reception, at 1112, may be performed by the reception component 1330 of the apparatus 1302 in FIG. 13.

At 1114, the second wireless device may switch beams for communication with the first wireless device in response to the indication. For example, referring to FIG. 4, the second wireless device 404 may switch, at 418, beams for communication with the first wireless device 402 in response to the beam blockage indication received, at 416. The switching, at 1114, may be performed by the switcher component 1344 of the apparatus 1302 in FIG. 13.

At 1116, the second wireless device may receive a NACK on each of multiple beams that are expected to experience a failure. For example, referring to FIG. 4, the second wireless device 404 may receive, at 420, NACK(s) from the first wireless device 402 on beams that are expected to experience a beam failure. The indication received, at 420, may comprise NACK(s) that are independent of a data transmission on at least one beam of the set of beams. The reception, at 1116, may be performed by the reception component 1330 of the apparatus 1302 in FIG. 13.

At 1118, the second wireless device may detect a LoS condition between the second wireless device and the first wireless device. For example, referring to FIG. 4, the second wireless device 404 may detect, at 422, a LoS condition between the second wireless device 404 and the first wireless device 402. The detecting, at 1118, may be performed by the detection component 1340 of the apparatus 1302 in FIG. 13.

At 1120, the second wireless device may indicate to the first wireless device to stop monitoring the set of beams. For example, referring to FIG. 4, the second wireless device 404 may transmit, at 424, an indication to the first wireless device 402 to stop monitoring the set of beams configured, at 408, based on the LoS condition detected, at 422, between the second wireless device 404 and the first wireless device 402. The indication, at 1120, may be performed by the indication component 1346 of the apparatus 1302 in FIG. 13.

Figure 12:
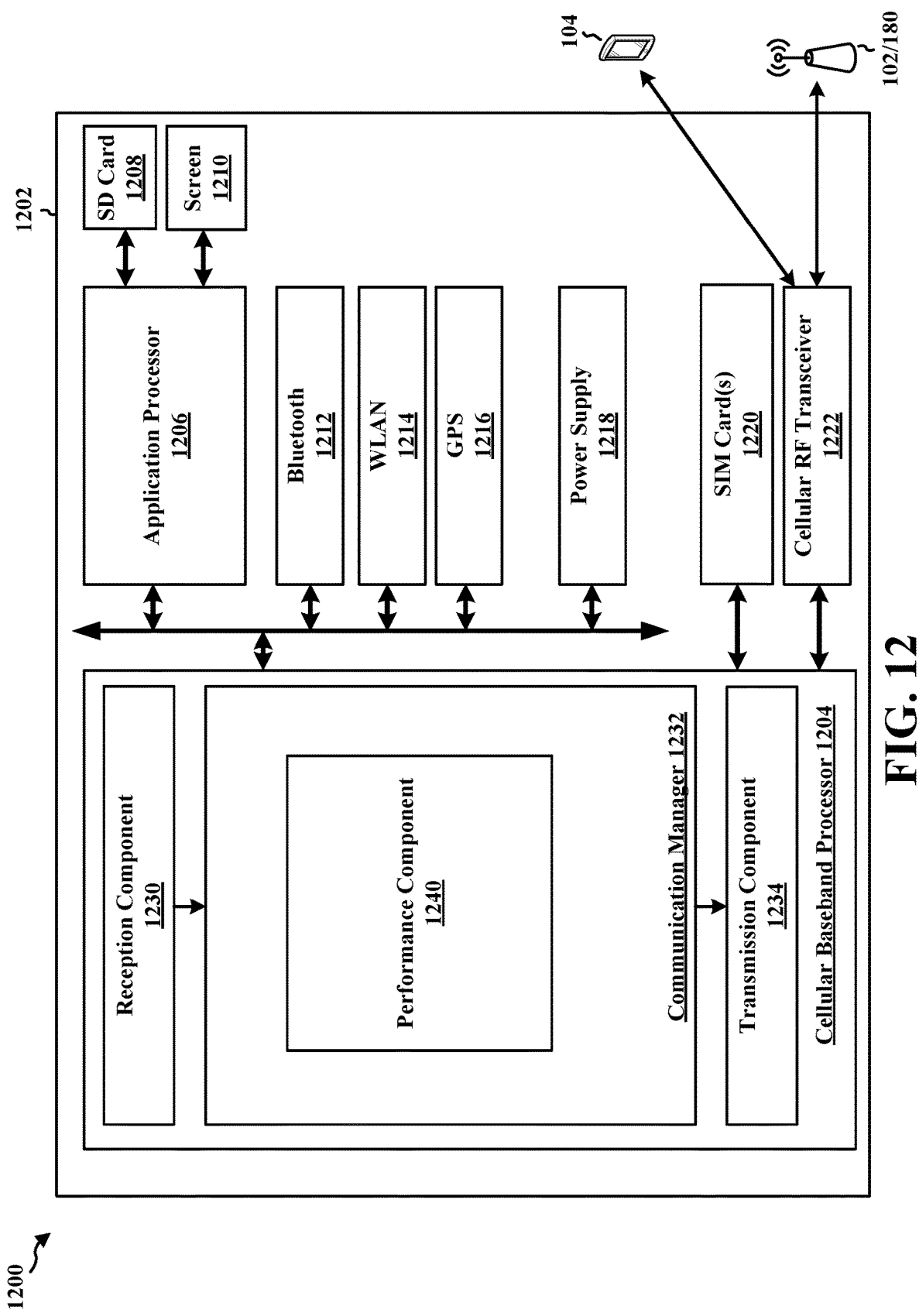
FIG. 12 is a diagram illustrating an example of a hardware implementation for an example apparatus, in accordance with aspects presented herein.

FIG. 12 is a diagram 1200 illustrating an example of a hardware implementation for an apparatus 1202. In some aspects, the apparatus 1202 may be a UE, a component of a UE, or may implement UE functionality. In some aspects, the apparatus 1202 may include a cellular baseband processor 1204 (also referred to as a modem) coupled to a cellular RF transceiver 1222. In some aspects, the apparatus 1202 may further include one or more subscriber identity modules (SIM) cards 1220, an application processor 1206 coupled to a secure digital (SD) card 1208 and a screen 1210, a Bluetooth module 1212, a wireless local area network (WLAN) module 1214, a Global Positioning System (GPS) module 1216, or a power supply 1218. The cellular baseband processor 1204 communicates through the cellular RF transceiver 1222 with the UE 104 and/or BS 102/180. The cellular baseband processor 1204 may include a computer-readable medium/memory. The computer-readable medium/memory may be non-transitory. The cellular baseband processor 1204 is responsible for general processing, including the execution of software stored on the computer-readable medium/memory. The software, when executed by the cellular baseband processor 1204, causes the cellular baseband processor 1204 to perform the various functions described supra. The computer-readable medium/memory may also be used for storing data that is manipulated by the cellular baseband processor 1204 when executing software. The cellular baseband processor 1204 further includes a reception component 1230, a communication manager 1232, and a transmission component 1234. The communication manager 1232 includes the one or more illustrated components. The components within the communication manager 1232 may be stored in the computer-readable medium/memory and/or configured as hardware within the cellular baseband processor 1204. The cellular baseband processor 1204 may be a component of the device 350 and may include the memory 360 and/or at least one of the TX processor 368, the RX processor 356, and the controller/processor 359. In one configuration, the apparatus 1202 may be a modem chip and include just the baseband processor 1204, and in another configuration, the apparatus 1202 may be the entire device (e.g., see 350 of FIG. 3) and include the additional modules of the apparatus 1202.

The reception component 1230 is configured, e.g., as described in connection with 802, 902, 906, and 914, to receive, from a second wireless device, a configuration to monitor for a potential obstruction for a set of one or more beams for wireless communication with the second wireless device; to receive a configuration from a second wireless device to monitor a set of beams for beam blocking with the second wireless device; to receive a CSI-RS on one or more beam of the set of beams; and to receive an indication from the second wireless device to stop monitoring the set of beams. The communication manager 1232 includes a performance component 1240 that is configured, e.g., as described in connection with 804 and 904, to perform radar detection for the potential obstruction to the set of one or more beams for the wireless communication with the second wireless device; and to perform radar detection of potential obstructions to the set of beams between the second wireless device and the first wireless device. The transmission component 1234 is configured, e.g., as described in connection with 908, 910, and 912, to transmit a CSI report for the one or more beam of the set of beams; to transmit, to the second wireless device, an indication of potential beam blockage based on the radar detection; and to transmit a NACK on each of multiple beams that are expected to experience a failure.

The apparatus may include additional components that perform each of the blocks of the algorithm in the flowcharts of FIGS. 8-9. As such, each block in the flowcharts of FIGS. 8-9 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

As shown, the apparatus 1202 may include a variety of components configured for various functions. In one configuration, the apparatus 1202, and in particular the cellular baseband processor 1204, includes means for receiving, from a second wireless device, a configuration to monitor for a potential obstruction for a set of one or more beams for wireless communication with the second wireless device; and means for performing radar detection for the potential obstruction to the set of one or more beams for the wireless communication with the second wireless device. The apparatus 1202 further includes means for receiving a configuration from a second wireless device to monitor a set of beams for beam blocking with the second wireless device; and means for performing radar detection of potential obstructions to the set of beams between the second wireless device and the first wireless device. The apparatus 1202 further includes means for transmitting, to the second wireless device, an indication of potential beam blockage based on the radar detection. The apparatus 1202 further includes means for transmitting the NACK on each of multiple beams that are expected to experience a failure. The apparatus 1202 further includes means for receiving an indication from the second wireless device to stop monitoring the set of beams. The apparatus 1202 further includes means for receiving a CSI-RS on one or more beam of the set of beams; and means for transmitting a CSI report for the one or more beam of the set of beams.

The means may be one or more of the components of the apparatus 1202 configured to perform the functions recited by the means. As described supra, the apparatus 1202 may include the TX Processor 368, the RX Processor 356, and the controller/processor 359. As such, in one configuration, the means may be the TX Processor 368, the RX Processor 356, and the controller/processor 359 configured to perform the functions recited by the means.

Figure 13:
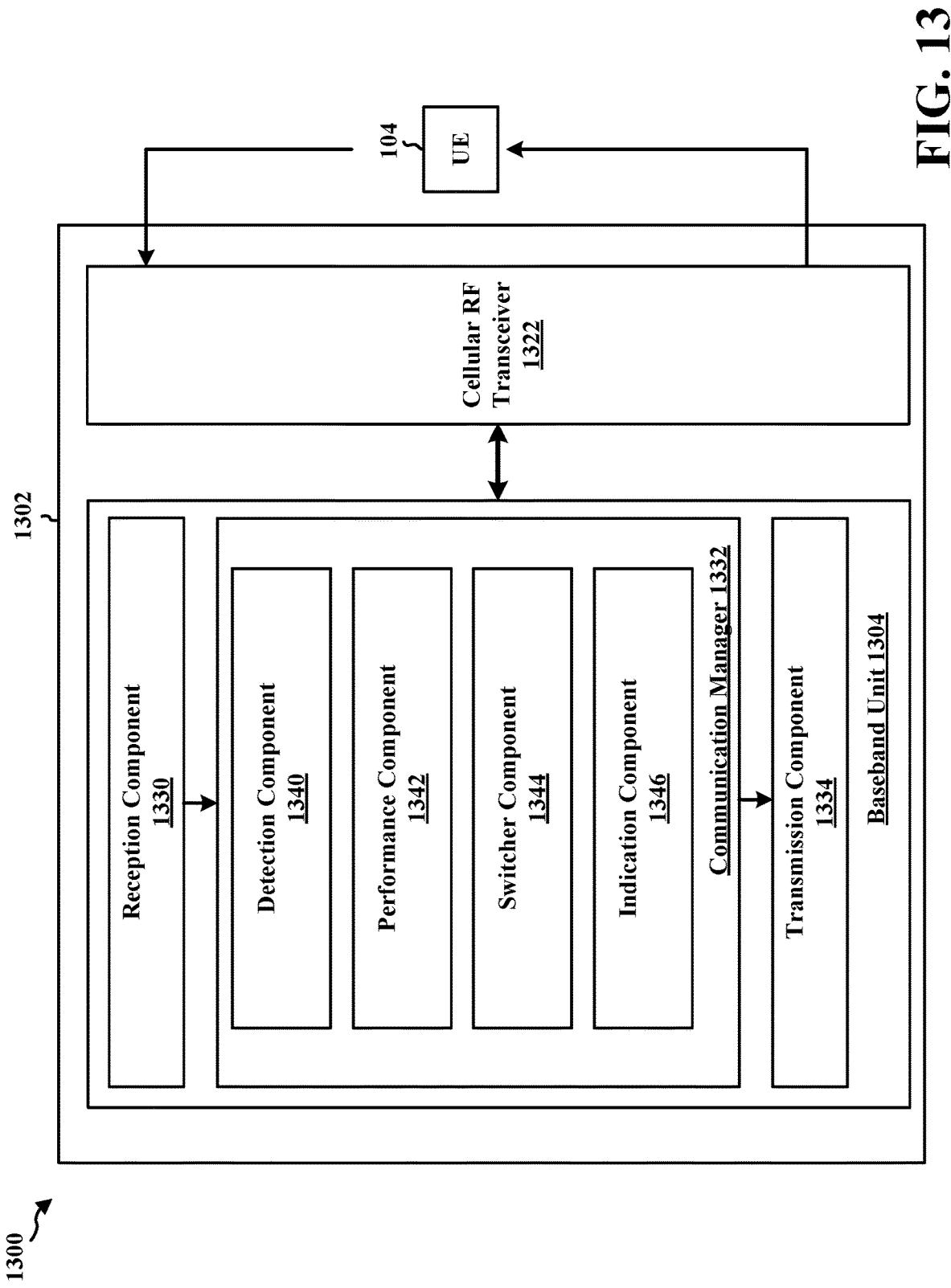
FIG. 13 is a diagram illustrating an example of a hardware implementation for an example apparatus, in accordance with aspects presented herein.

FIG. 13 is a diagram 1300 illustrating an example of a hardware implementation for an apparatus 1302. In some aspects, apparatus 1302 may be a base station, a component of a base station, or may implement base station functionality. In some aspects, the apparatus 1302 may be a UE, an RSU, an IAB node, or a component of such. In some aspects, the apparatus 1202 may include a baseband unit 1304. The baseband unit 1304 may communicate through a cellular RF transceiver 1322 with the UE 104. The baseband unit 1304 may include a computer-readable medium/memory. The baseband unit 1304 is responsible for general processing, including the execution of software stored on the computer-readable medium/memory. The software, when executed by the baseband unit 1304, causes the baseband unit 1304 to perform the various functions described supra. The computer-readable medium/memory may also be used for storing data that is manipulated by the baseband unit 1304 when executing software. The baseband unit 1304 further includes a reception component 1330, a communication manager 1332, and a transmission component 1334. The communication manager 1332 includes the one or more illustrated components. The components within the communication manager 1332 may be stored in the computer-readable medium/memory and/or configured as hardware within the baseband unit 1304. The baseband unit 1304 may be a component of the device 310 and may include the memory 376 and/or at least one of the TX processor 316, the RX processor 370, and the controller/processor 375.

The communication manager 1332 includes a detection component 1340 that is configured, e.g., as described in connection with 1102, and 1118, to detect a NLoS condition between a second wireless device and a UE; and to detect a LoS condition between the second wireless device and the UE. The communication manager 1332 further includes a performance component 1342 that is configured, e.g., as described in connection with 1106, to perform radar detection at the second wireless device to monitor for the beam blocking from a first perspective of the second wireless device—the configuration configures the UE to monitor for the beam blocking from a second perspective of the UE. The communication manager 1332 further includes a switcher component 1344 that is configured, e.g., as described in connection with 1114, to switch beams for communication with the UE in response to the indication. The communication manager 1332 further includes an indication component 1346 that is configured, e.g., as described in connection with 1120, to indicate to the UE to stop monitoring the set of beams.

The reception component 1330 is configured, e.g., as described in connection with 1004, 1110, 1112, and 1116, to receive, from the first wireless device, information based on radar measurement associated with the set of one or more beams for the wireless communication with the second wireless device; to receive a CSI report for the one or more beam of the set of beams; to receive, from the UE, an indication of a potential beam blockage; and to receive a NACK on each of multiple beams that are expected to experience a failure. The transmission component 1334 is configured, e.g., as described in connection with 1002, 1104, and 1108, to transmit, to a first wireless device, a configuration to monitor for a potential obstruction for a set of one or more beams for wireless communication with the second wireless device; to transmit a configuration to the UE of a set of beams to monitor for beam blocking in response to the NLOS condition between the second wireless device and the UE; and to transmit a CSI-RS on one or more beam of the set of beams.

The apparatus may include additional components that perform each of the blocks of the algorithm in the flowcharts of FIGS. 10-11. As such, each block in the flowcharts of FIGS. 10-11 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

As shown, the apparatus 1302 may include a variety of components configured for various functions. In one configuration, the apparatus 1302, and in particular the baseband unit 1304, includes means for transmitting, to a first wireless device, a configuration to monitor for a potential obstruction for a set of one or more beams for wireless communication with the second wireless device; and means for receiving, from the first wireless device, information based on radar measurement associated with the set of one or more beams for the wireless communication with the second wireless device. The apparatus 1302 further includes means for detecting a NLoS condition between the second wireless device and a UE; and means for transmitting a configuration to the UE of a set of beams to monitor for beam blocking in response to the NLOS condition between the second wireless device and the UE. The apparatus 1302 further includes means for receiving, from the UE, an indication of a potential beam blockage; and means for switching beams for communication with the UE in response to the indication. The apparatus 1302 further includes means for receiving the NACK on each of multiple beams that are expected to experience a failure. The apparatus 1302 further includes means for performing radar detection at the second wireless device to monitor for the beam blocking from a first perspective of the second wireless device, wherein the configuration configures the UE to monitor for the beam blocking from a second perspective of the UE. The apparatus 1302 further includes means for detecting a LoS condition between the second wireless device and the UE; and means for indicating to the UE to stop monitoring the set of beams. The apparatus 1302 further includes means for transmitting a CSI-RS on one or more beam of the set of beams; and means for receiving a CSI report for the one or more beam of the set of beams.

The means may be one or more of the components of the apparatus 1302 configured to perform the functions recited by the means. As described supra, the apparatus 1302 may include the TX Processor 316, the RX Processor 370, and the controller/processor 375. As such, in one configuration, the means may be the TX Processor 316, the RX Processor 370, and the controller/processor 375 configured to perform the functions recited by the means.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Terms such as "if," "when," and "while" should be interpreted to mean "under the condition that" rather than imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

The following aspects are illustrative only and may be combined with other aspects or teachings described herein, without limitation.

Aspect 1 is a method of wireless communication at a first wireless device, comprising: receiving, from a second wireless device, a configuration to monitor for a potential obstruction for a set of one or more beams for wireless communication with the second wireless device; and performing radar detection for the potential obstruction to the set of one or more beams for the wireless communication with the second wireless device.

Aspect 2 may be combined with aspect 1 and further includes transmitting, to the second wireless device, an indication of the potential obstruction based on the radar detection.

Aspect 3 may be combined with any of aspects 1-2 and includes that the indication comprises a list of one or more beams that are expected to experience a failure.

Aspect 4 may be combined with any of aspects 1-3 and includes that the indication comprises a NACK independent of a data transmission on at least one beam of the set of one or more beams.

Aspect 5 may be combined with any of aspects 1-4 and further includes transmitting the NACK on each beam of the set of one or more beams that are expected to experience a failure.

Aspect 6 may be combined with any of aspects 1-5 and further includes receiving an indication from the second wireless device to stop monitoring the set of one or more beams.

Aspect 7 may be combined with any of aspects 1-6 and includes that each beam of the set of one or more beams is associated with an SSB.

Aspect 8 may be combined with any of aspects 1-7 and includes that each beam of the set of one or more beams is associated with a CSI-RS.

Aspect 9 may be combined with any of aspects 1-8 and further includes receiving a CSI-RS on the set of one or more beams; and transmitting a CSI report for the set of one or more beams.

Aspect 10 is a method of wireless communication at a second wireless device, comprising: transmitting, to a first wireless device, a configuration to monitor for a potential obstruction for a set of one or more beams for wireless communication with the second wireless device; and receiving, from the first wireless device, information based on radar measurement associated with the set of one or more beams for the wireless communication with the second wireless device.

Aspect 11 may be combined with aspect 10 and includes that the configuration is for radar detection of the potential obstruction for the set of one or more beams for the wireless communication with the second wireless device.

Aspect 12 may be combined with any of aspects 10-11 and further includes receiving, from the first wireless device, an indication of the potential obstruction; and switching beams for communication with the first wireless device in response to the indication.

Aspect 13 may be combined with any of aspects 10-12 and includes that the indication comprises a list of beams in the set of one or more beams that are expected to experience a failure.

Aspect 14 may be combined with any of aspects 10-13 and includes that the indication comprises a NACK independent of a data transmission on at least one beam of the set of one or more beams.

Aspect 15 may be combined with any of aspects 10-14 and further includes receiving the NACK on each beam indicated in the list of beams that are expected to experience a failure.

Aspect 16 may be combined with any of aspects 10-15 and further includes performing radar detection at the second wireless device to monitor for the potential obstruction from a first perspective of the second wireless device, wherein the configuration configures the first wireless device to monitor for the potential obstruction from a second perspective of the first wireless device.

Aspect 17 may be combined with any of aspects 10-16 and further includes detecting a LOS condition between the second wireless device and the first wireless device; and indicating to the first wireless device to stop monitoring the set of one or more beams.

Aspect 18 may be combined with any of aspects 10-17 and includes that each beam of the set of one or more beams is associated with an SSB.

Aspect 19 may be combined with any of aspects 10-18 and includes that each beam of the set of one or more beams is associated with a CSI-RS.

Aspect 20 may be combined with any of aspects 10-19 and further includes transmitting a CSI-RS on the set of one or more beams; and receiving a CSI report for the set of one or more beams.

Aspect 21 is an apparatus for wireless communication including memory and at least one processor coupled to the memory, the memory and the at least one processor configured to perform the method of any of aspects 1-9.

Aspect 22 may be combined with any of aspects 1-9 or 21 and includes that the first wireless device is a UE and the second wireless device is a second UE, a base station, an RSU, or an IAB node.

Aspect 23 may be combined with any of aspects 1-9 or 21-22 and further includes at least one of an antenna or a transceiver coupled to the at least one processor.

Aspect 24 is an apparatus for wireless communication including means for performing the method of any of aspects 1-9.

Aspect 25 may be combined with any of aspects 1-9 or 24 and includes that the first wireless device is a UE and the second wireless device is a second UE, a base station, an RSU, or an IAB node.

Aspect 26 may be combined with any of aspects 1-9 or 24-25 and further includes at least one of an antenna or a transceiver coupled to the means for performing the method of any of aspects 1-9.

Aspect 27 is a non-transitory computer-readable storage medium storing computer executable code, the code when executed by at least one processor causes the at least one processor to perform the method of any of aspects 1-9.

Aspect 28 is an apparatus for wireless communication including memory and at least one processor coupled to the memory, the memory and the at least one processor configured to perform the method of any of aspects 10-20.

Aspect 29 may be combined with any of aspects 10-20 or 28 and includes that the first wireless device is a UE and the second wireless device is a second UE, a base station, an RSU, or an IAB node.

Aspect 30 may be combined with any of aspects 10-20 or 28-29 and further includes at least one of an antenna or a transceiver coupled to the at least one processor.

Aspect 31 is an apparatus for wireless communication including means for performing the method of any of aspects 10-20.

Aspect 32 may be combined with any of aspects 10-20 or 31 and includes that the first wireless device is a UE and the second wireless device is a second UE, a base station, an RSU, or an IAB node.

Aspect 33 may be combined with any of aspects 10-20 or 31-32 and further includes at least one of an antenna or a transceiver coupled to the means for performing the method of any of aspects 10-20.

Aspect 34 is a non-transitory computer-readable storage medium storing computer executable code, the code when executed by at least one processor causes the at least one processor to perform the method of any of aspects 10-20.

What is claimed is:

1. An apparatus for wireless communication at a first wireless device, comprising:
   memory; and
   one or more processors coupled to the memory and configured to cause the first wireless device to:
      receive, from a second wireless device, a configuration to monitor a set of one or more beams and monitor for a potential obstruction for the set of one or more beams for wireless communication with the second wireless device; and
      perform radar detection for the potential obstruction to the set of one or more beams for the wireless communication with the second wireless device.

2. The apparatus of claim 1, wherein the one or more processors are further configured to cause the first wireless device to transmit, to the second wireless device, an indication of the potential obstruction based on the radar detection.

3. The apparatus of claim 2, wherein the indication comprises a list of one or more beams that are expected to experience a failure.

4. The apparatus of claim 2, wherein the indication comprises a negative acknowledgement (NACK) independent of a data transmission on at least one beam of the set of one or more beams.

5. The apparatus of claim 4, wherein the one or more processors are further configured to cause the first wireless device to transmit the NACK on each beam of the set of one or more beams that are expected to experience a failure.

6. The apparatus of claim 1, wherein the one or more processors are further configured to cause the first wireless device to receive an indication from the second wireless device to stop monitoring the set of one or more beams.

7. The apparatus of claim 1, wherein each beam of the set of one or more beams is associated with a synchronization signal block (SSB).

8. The apparatus of claim 1, wherein each beam of the set of one or more beams is associated with a channel state information reference signal (CSI-RS).

9. The apparatus of claim 1, further comprising at least one of an antenna or a transceiver, wherein the one or more processors are further configured to cause the first wireless device to:
   receive a channel state information reference signal (CSI-RS) on the set of one or more beams; and
   transmit a CSI report for the set of one or more beams.

10. The apparatus of claim 1, wherein the first wireless device is a user equipment (UE) and the second wireless device is a second UE, a base station, a roadside unit (RSU), or an integrated access and backhaul (IAB) node.

11. The apparatus of claim 1, wherein the potential obstruction is associated with a non-line of sight (NLOS) portion of a communication link between the first wireless device and the second wireless device from a perspective of the second wireless device, and wherein the potential obstruction is associated with a line of sight (LOS) portion of the communication link between the first wireless device and the second wireless device from a perspective of the first wireless device.

12. An apparatus for wireless communication at a second wireless device, comprising:
   memory; and
   one or more processors coupled to the memory and configured to cause the second wireless device to:
      transmit, to a first wireless device, a configuration to monitor a set of one or more beams and monitor for a potential obstruction for the set of one or more beams for wireless communication with the second wireless device; and
      receive, from the first wireless device, information based on radar measurement associated with the set of one or more beams for the wireless communication with the second wireless device.

13. The apparatus of claim 12, wherein the one or more processors are further configured to cause the second wireless device to:
   detect a non-line of sight (NLOS) condition between the second wireless device and the first wireless device, wherein to transmit the configuration, the one or more processors are configured to cause the second wireless device to transmit the configuration in response to the detection of the NLOS condition.

14. The apparatus of claim 12, wherein the configuration is for radar detection of the potential obstruction for the set of one or more beams for the wireless communication with the second wireless device.

15. The apparatus of claim 12, wherein the one or more processors are further configured to cause the second wireless device to:
   receive, from the first wireless device, an indication of the potential obstruction; and
   switch beams for communication with the first wireless device in response to the reception of the indication.

16. The apparatus of claim 15, wherein the indication comprises a list of beams in the set of one or more beams that are expected to experience a failure.

17. The apparatus of claim 16, wherein the indication comprises a negative acknowledgement (NACK) independent of a data transmission on at least one beam of the set of one or more beams.

18. The apparatus of claim 17, wherein the one or more processors are further configured to cause the second wireless device to receive the NACK on each beam indicated in the list of beams that are expected to experience the failure.

19. The apparatus of claim 12, wherein the one or more processors are further configured to cause the second wireless device to perform radar detection at the second wireless device to monitor for the potential obstruction from a first perspective of the second wireless device, wherein the configuration configures the first wireless device to monitor for the potential obstruction from a second perspective of the first wireless device.

20. The apparatus of claim 12, wherein the one or more processors are further configured to cause the second wireless device to:
   detect a line of sight (LOS) condition between the second wireless device and the first wireless device; and
   indicate to the first wireless device to stop monitoring the set of one or more beams.

21. The apparatus of claim 12, wherein each beam of the set of one or more beams is associated with a synchronization signal block (SSB).

22. The apparatus of claim 12, wherein each beam of the set of one or more beams is associated with a channel state information reference signal (CSI-RS).

23. The apparatus of claim 12, wherein the one or more processors are further configured to cause the second wireless device to:
   transmit a channel state information reference signal (CSI-RS) on the set of one or more beams; and
   receive a CSI report for the set of one or more beams.

24. The apparatus of claim 12, wherein the first wireless device is a user equipment (UE) and the second wireless device is a second UE, a base station, a roadside unit (RSU), or an integrated access and backhaul (IAB) node.

25. The apparatus of claim 12, wherein the potential obstruction is associated with a non-line of sight (NLOS) portion of a communication link between the first wireless device and the second wireless device from a perspective of the second wireless device, and wherein the potential obstruction is associated with a line of sight (LOS) portion of the communication link between the first wireless device and the second wireless device from a perspective of the first wireless device.

26. A method of wireless communication at a first wireless device, comprising:
    receiving, from a second wireless device, a configuration to monitor a set of one or more beams and monitor for a potential obstruction for the set of one or more beams for wireless communication with the second wireless device; and
    performing radar detection for the potential obstruction to the set of one or more beams for the wireless communication with the second wireless device.

27. The method of claim 26, further comprising transmitting, to the second wireless device, an indication of the potential obstruction based on the radar detection.

28. The method of claim 27, wherein the indication comprises a list of one or more beams that are expected to experience a failure.

29. The method of claim 26, wherein the potential obstruction is associated with a non-line of sight (NLOS) portion of a communication link between the first wireless device and the second wireless device from a perspective of the second wireless device, and wherein the potential obstruction is associated with a line of sight (LOS) portion of the communication link between the first wireless device and the second wireless device from a perspective of the first wireless device.

30. A method of wireless communication at a second wireless device, comprising:
    transmitting, to a first wireless device, a configuration to monitor a set of one or more beams and monitor for a potential obstruction for the set of one or more beams for wireless communication with the second wireless device; and
    receiving, from the first wireless device, information based on radar measurement associated with the set of one or more beams for the wireless communication with the second wireless device.

31. The method of claim 30, wherein the configuration is for radar detection of the potential obstruction for the set of one or more beams for the wireless communication with the second wireless device.

32. The method of claim 30, further comprising:
    receiving, from the first wireless device, an indication of the potential obstruction; and
    switching beams for communication with the first wireless device in response to the indication.

33. The method of claim 32, wherein the indication comprises a list of beams in the set of one or more beams that are expected to experience a failure.

34. The method of claim 30, wherein the potential obstruction is associated with a non-line of sight (NLOS) portion of a communication link between the first wireless device and the second wireless device from a perspective of the second wireless device, and wherein the potential obstruction is associated with a line of sight (LOS) portion of the communication link between the first wireless device and the second wireless device from a perspective of the first wireless device.

35. A non-transitory computer-readable storage medium storing computer executable code at a first wireless device, the computer executable code, when executed by one or more processors, causes the first wireless device to:
    receive, from a second wireless device, a configuration to monitor a set of one or more beams and monitor for a potential obstruction for the set of one or more beams for wireless communication with the second wireless device; and
    perform radar detection for the potential obstruction to the set of one or more beams for the wireless communication with the second wireless device.

36. A non-transitory computer-readable storage medium storing computer executable code at a second wireless device, the computer executable code, when executed by one or more processors, causes the second wireless device to:
    transmit, to a first wireless device, a configuration to monitor a set of one or more beams and monitor for a potential obstruction for the set of one or more beams for wireless communication with the second wireless device; and
    receive, from the first wireless device, information based on radar measurement associated with the set of one or more beams for the wireless communication with the second wireless device.

* * * * *